United States Patent [19]
Rokutan

[11] Patent Number: 5,298,730
[45] Date of Patent: Mar. 29, 1994

[54] OPTICAL CARD APPARATUS IN WHICH RETRIAL OF LOCATING OPERATION OF OPTICAL CARD IS RETRIED ON ANOTHER TRACK AT THE TIME OF LOADING THE SAME

[75] Inventor: Takao Rokutan, Higashimurayama, Japan

[73] Assignee: Olympus Optical Co., Ltd., Tokyo, Japan

[21] Appl. No.: 824,285

[22] Filed: Jan. 23, 1992

[30] Foreign Application Priority Data

Jan. 29, 1991 [JP] Japan .................................. 3-9170

[51] Int. Cl.⁵ ...................... G06K 13/067; G11B 7/08
[52] U.S. Cl. .................................. 235/476; 369/44.32
[58] Field of Search .............................. 235/454, 476; 369/44.32, 4.26, 44.27

[56] References Cited

U.S. PATENT DOCUMENTS

| | | | |
|---|---|---|---|
| 4,950,876 | 8/1990 | Saito | 235/476 |
| 4,982,391 | 1/1991 | Sakagami et al. | 235/454 X |
| 5,008,552 | 4/1991 | Kuramochi et al. | 235/454 X |
| 5,083,301 | 1/1992 | Matoba et al. | 369/32 |
| 5,105,072 | 4/1992 | Saito | 235/476 |

FOREIGN PATENT DOCUMENTS 2-154364 6/1990 Japan .

Primary Examiner—Davis L. Willis
Assistant Examiner—Edward Sikorski
Attorney, Agent, or Firm—Armstrong, Westerman, Hattori, McLeland & Naughton

[57] ABSTRACT

Tracks formed on an optical card loaded into a card holder are scanned so that ID information about a reference position on the card is read. This ID information may be used to correct an appraisal of where the card is loaded on the card holder. If the correction operation fails, then the optical head is moved in a direction transverse to the tracks to again perform the correction operation at another track.

21 Claims, 13 Drawing Sheets

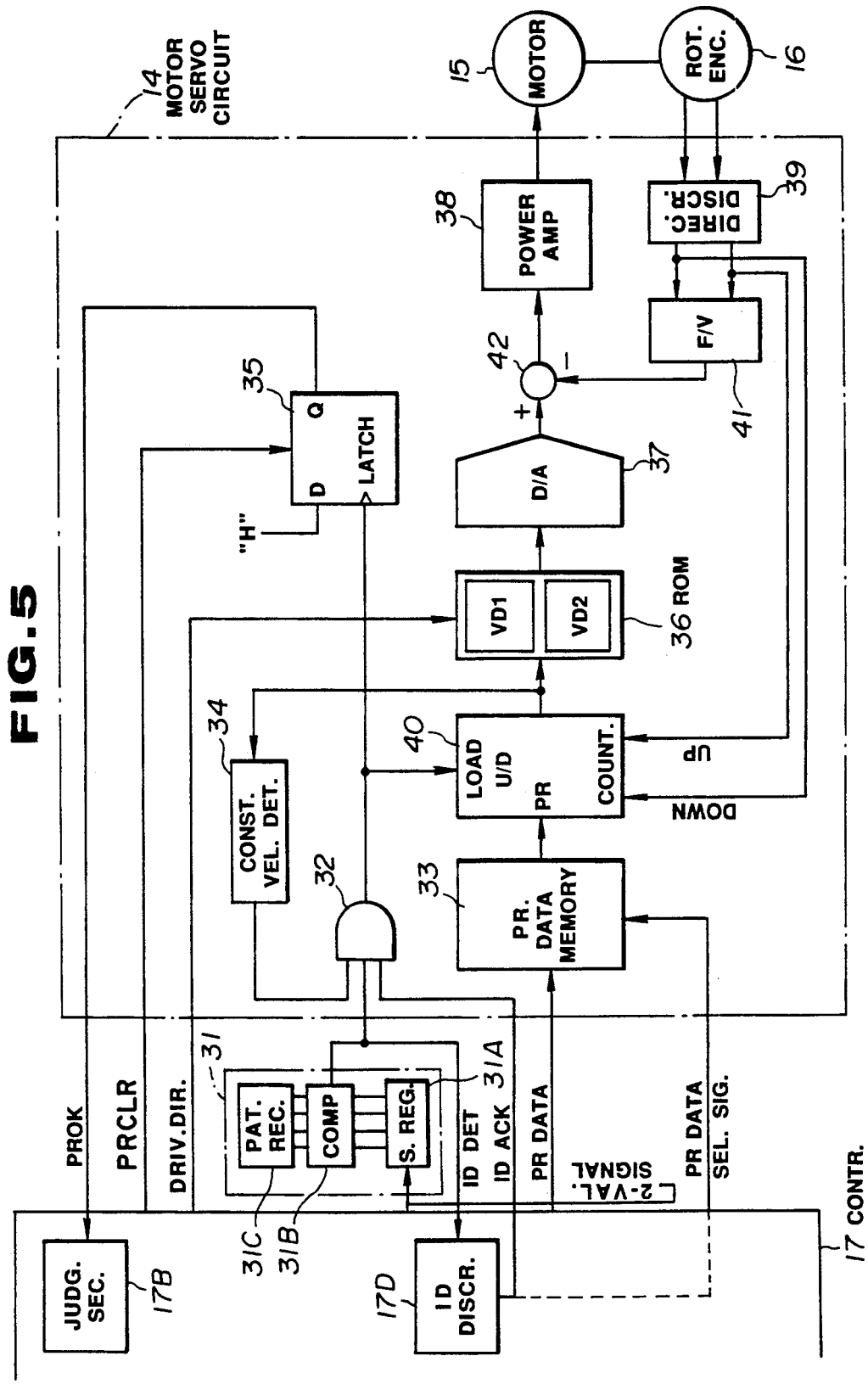

OPTICAL CARD APPARATUS IN WHICH RETRIAL OF LOCATING OPERATION OF OPTICAL CARD IS RETRIED ON ANOTHER TRACK AT THE TIME OF LOADING THE SAME

BACKGROUND OF THE INVENTION

1. Field of the Invention

The present invention relates to an optical card apparatus arranged in such a manner that an action of relatively locating an optical card with respect to an optical head is retried on another track if the above-described action results in failure at the time of loading the optical card.

2. Description of the Related Art

An optical information recording medium, for example, an optical card, exhibits an advantage in that it can be easily carried because its size and the shape are the same as those of the credit card. Another advantage is that it has a large recording capacity and a low cost per card. Therefore, a variety of types of optical cards have been suggested recently to serve as next generation information recording medium.

An optical card apparatus serving as a conventional optical recording/reproducing apparatus, which uses an optical card of the above-described type, has been disclosed in Japanese Patent Laid-Open No. 2-154264 or U.S. Pat. No. 4,950,876.

As shown in FIG. 1, an optical card 1 for use in the above-described optical card apparatus is formed into a rectangular shape and having an optical recording portion 3 arranged in such a manner that a plurality of parallel straight tracks 2 are formed therein, the optical recording portion 3 serving as an optical recording region. In order to be capable of reading recorded data in the optical recording portion 3 regardless of the direction of scanning performed on the track, ID portions 3A and 3B, to which information denoting the address corresponding to each track, are formed at the two end portions, the ID portions 3A and 3B being formed in the opposite direction to each other. As a data portion 4 for recording data, the optical recording portion 3 is formed between the above-described ID portions 3A and 3B.

Therefore, when the optical card 1 is moved with respect to the position of an optical head 5 (see FIG. 2 or FIG. 3) in a direction, for example, from the left portion to the right portion along the track (hereinafter this direction is called a "forward direction"), the left ID portion 3A is read, while the right ID portion 3B is read when the optical card 1 is moved from the right portion to the left portion (hereinafter this direction is called a "reverse direction"). As a result, track address information which corresponds to the track can be recognized. In the structure arranged as described above, the two ID portions 3A and 3B respectively are formed at an inner portion at predetermined distance (for example, 4 mm) away from the end portion of the optical card 1 in order to prevent an influence of damage or a contamination of the card end portion and as well as to sufficiently stable the relative movement velocity in a direction of the track between the optical card 1 and the optical head 5.

As shown in FIG. 2, the optical card 1 is manually or automatically first inserted into a card holder 6 which has guide grooves formed in the two horizontal end portions thereof. As a result, a state of insertion (loading) as shown in FIG. 3 is realized. In the above-described state of loading, the optical head 5 is able to move in a direction of X. Since the optical card 1 is not located with respect to the position of the optical head 3 in the above-described state of loading, the above-described relative location must be compensated (an error taken place in loading of the optical card 1 must be compensated) so as to enable recording/reproducing data to and from an arbitrary track to be performed.

That is, the optical card 1 loaded into the card holder 6 is not accurately positioned with respect to the card holder 6 (or the optical head 5) such that the identification action can be performed. Therefore, access to an arbitrary track cannot be made in the above-described state. Therefore, it is necessary for a correcting action (also called a "presetting action") for correcting the relative position between the optical head 5 and the optical card 1 to be first performed.

The presetting action is performed in the following sequence arranged such that: the focus servo and the track servo are turned on when the optical card 1 is loaded into the card holder 6; the card holder 6 is moved to scan the track of the optical card 1 with beam spot S held in a tracking state; and thereby the ID portion formed on the optical card 1 is read.

However, in a case where there is a defect C such as dust or a flaw in the track (for example, a portion 2a shown in FIG. 3), to which presetting will be made, the above-described conventional example encounters a problem at the time of the presetting action in that the beam spot S for scanning the track deviates from a normal track servo state such that the beam spot S undesirably moves to a portion in the vicinity of the portion 2a of the track 2 (for example, the beam spot S undesirably scans a position deviated from pit columns on which information is recorded). If the retrial is made at the undesirable position to which the beam spot S has been moved, the presetting action cannot sometimes be performed in a case where there is a critical defect in the track.

If the above-described presetting action cannot be performed, the relative position between the optical card 1 and the optical head 5 cannot be located. As a result, access of an arbitrary track cannot be attained. Therefore, if the presetting action cannot be performed, recording/reproducing to and from the optical card 1 cannot be performed. In this case, neither recording nor reproducing can be performed and the optical card 1 is discharged from the card holder 6.

SUMMARY OF THE INVENTION

An object of the present invention is to provide an optical card apparatus capable of improving probability of succeeding in a presetting operation even if the presetting operation fails due to dust or failure or the like.

Another object of the present invention is to provide an optical card apparatus capable of improving its recording function and its reproducing function even if dust, a failure or the like is present.

According to the present invention, a means for retrying the presetting operation is provided which is arranged in such a manner that, in a case where an error has taken place in the presetting operation, an optical head or the like is moved in a direction which traverses tracks to again perform the presetting operation at a track which is different from the track at which the error has taken place. As a result, even if the presetting operation fails in a track in which dust or a flaw is present, retrial of the presetting operation is performed at another track so that possibility of succeeding in the presetting operation is improved.

Other and further objects, features and advantages of the invention will be appear more fully from the following description.

BRIEF DESCRIPTION OF THE DRAWINGS

FIGS. 4 to 8 illustrate a first embodiment of the present invention, wherein

FIG. 4 is a structural view which illustrates the structure of an optical card apparatus according to the first embodiment of the present invention;

FIG. 5 illustrates the structure of a motor servo circuit;

FIG. 6 illustrates an example of the speed of a card holder which is controlled in accordance with data transmitted from a ROM;

FIG. 7 illustrates an example of the track format of the optical card;

FIG. 8 is a flow chart which illustrates the presetting operation;

FIG. 15(b) is an enlarged view of FIG. 15(a) showing the two speeds used in the home recovery operation;

DETAILED DESCRIPTION OF PREFERRED EMBODIMENTS

Figure 1:
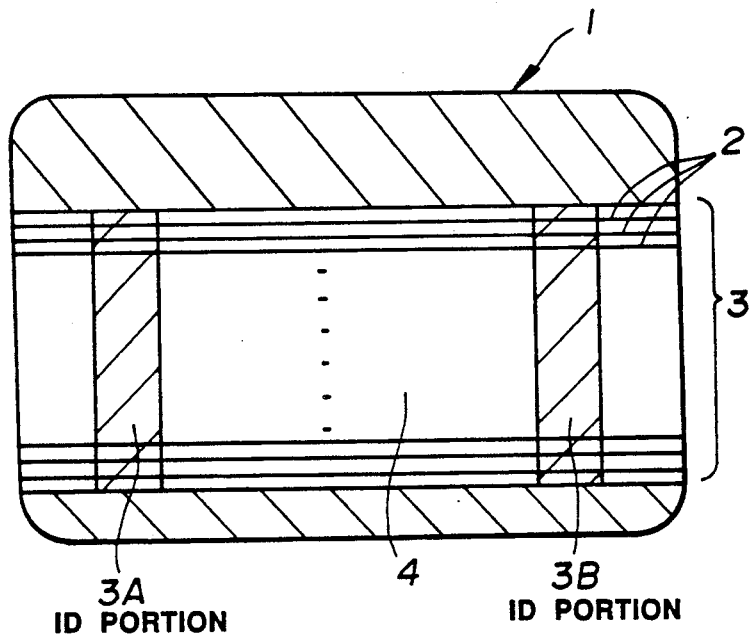
FIG. 1 illustrates a conventional optical card.
Figure 2:
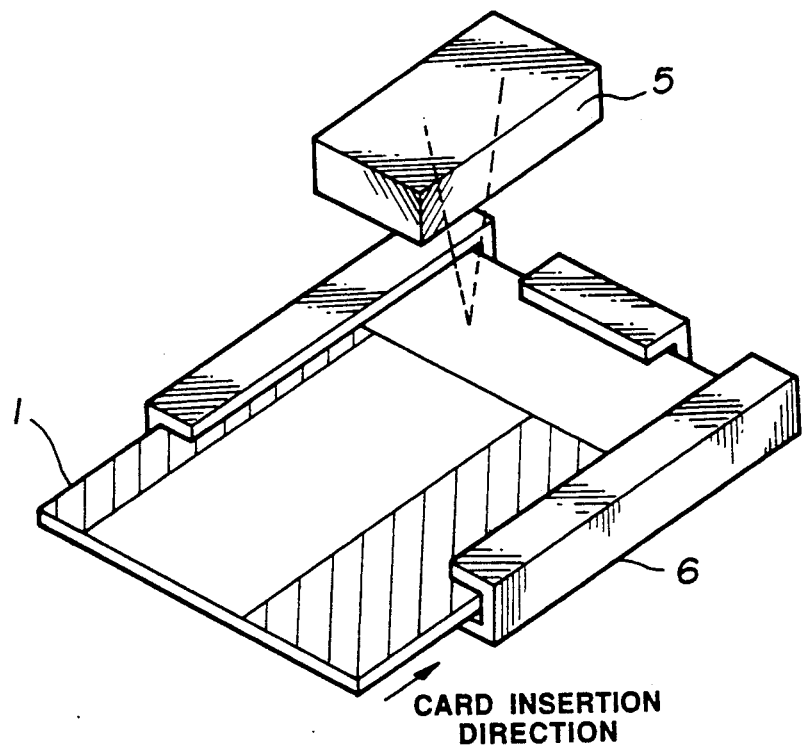
FIG. 2 is a perspective view which illustrates a state in which an optical card is loaded into a card holder.
Figure 3:
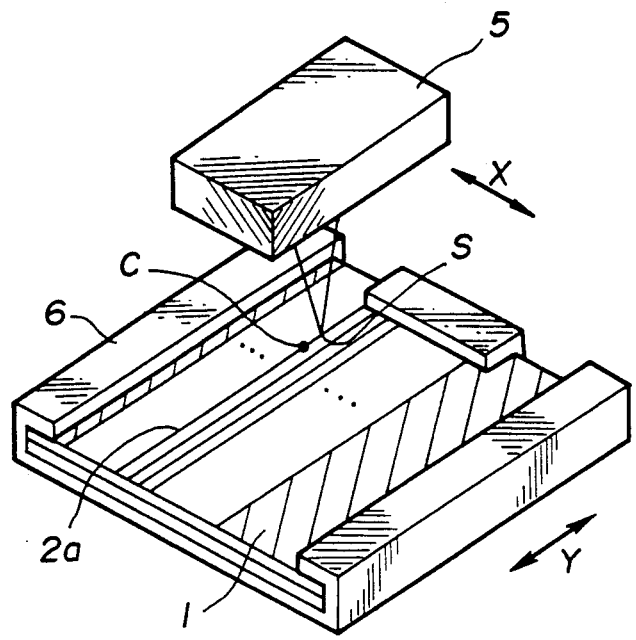
FIG. 3 is a perspective view which illustrates a state in which an operation of presetting an optical card loaded into the card holder by an optical head.
Figure 4:
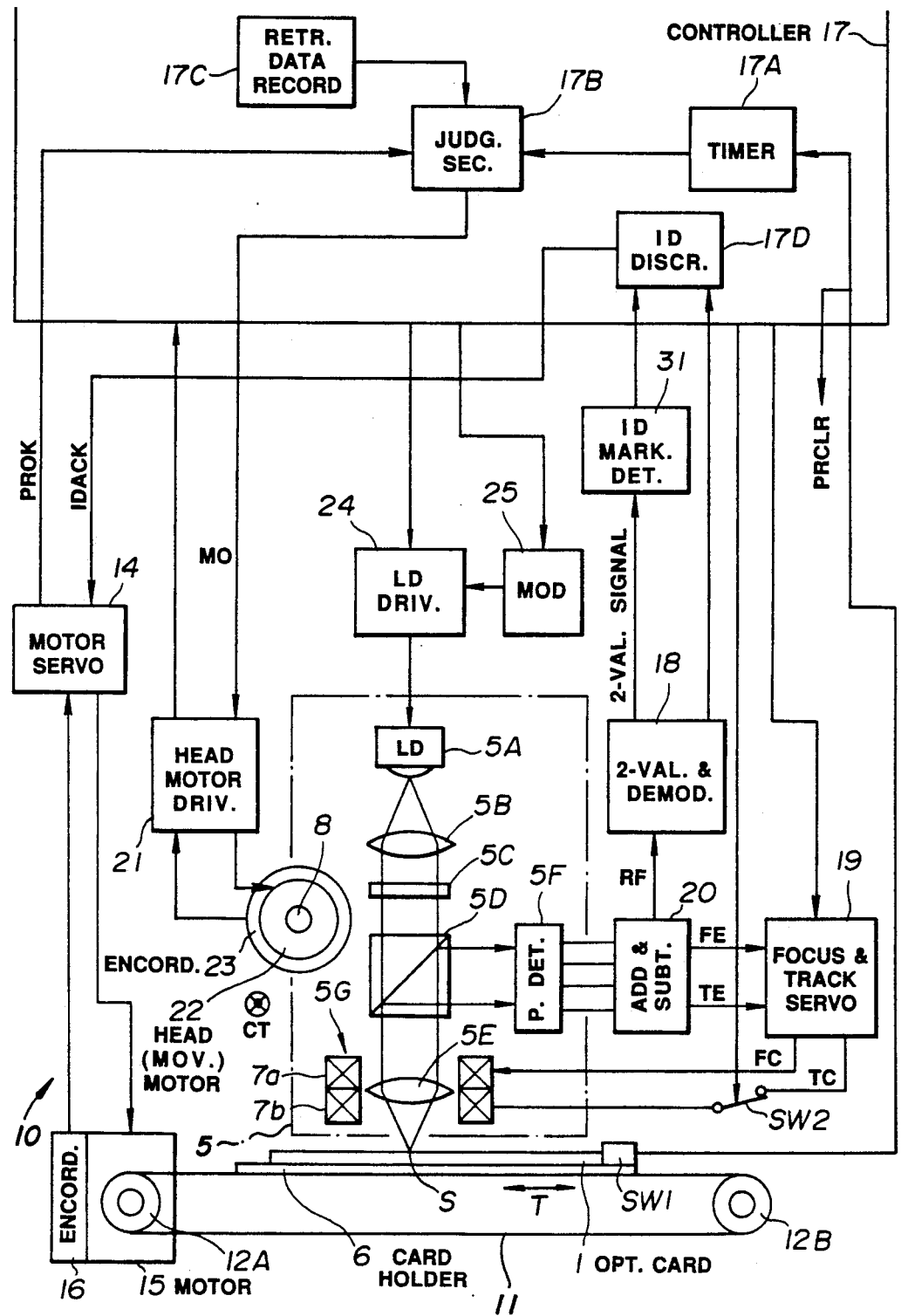

Preferred embodiments of the present invention will now be described with reference to drawings. As shown in FIG. 4, a first embodiment of an optical card recording/reproducing apparatus 10 performs recording/reproducing data by moving the optical card 1 shown in FIG. 1 in track direction T and as well as moving the optical head 5 in direction CT perpendicular to the track.

The optical card 1 is detachably loaded into a card holder 6 disposed at a predetermined position of a conveyance belt 1 arranged between two pulleys 12A and 12B. The optical card 1 is reciprocated in the direction T (hereinafter called a "track direction") which is in parallel to the linearly-formed track by a holder conveyance motor 15 the rotation of which is controlled by a motor servo circuit 14. As a result, the light beam to be applied to the optical card 1 scans the same in the track direction T. That is, the above-described holder conveyance motor 15 constitutes a means for relatively moving the light beam in the track direction T.

When loading of the optical card 1 to a predetermined position of the card holder 6 has been made, for example, a microswitch SW1 is switched on so that a signal denoting the fact that the optical card 1 has been loaded is transmitted to a controller 17. When the above-described signal is detected, the controller 17 rotates the holder conveyance motor 15 via the motor servo circuit 14. As a result, the relative positional location (that is, the presetting action) between the optical card 1 and the optical head 5 is made. The controller 17 starts the operation of a timer 17A at a time at which the above-described presetting action will be performed. Then, a judgement section 17B judges whether or not presetting OK signal PROK has been supplied within a predetermined time set by the timer 17A so that whether or not the presetting action has been performed normally is judged.

After the presetting action has been performed normally, data recording/reproducing can be performed. In a case where the presetting action cannot be performed, the controller 17 performs a control in such a manner that it reads retrial data stored in a retrial data recording portion 17C and causes retrial of the presetting action on another track to be performed in accordance with the above-described retrial data.

The above-described conveyance motor 15 has a rotary encoder 16 fastened thereto for the purpose of detecting the (relative) position (with respect to the optical head 5) of the card holder 6 in the track direction T so that a pulse which is proportion to the angle of the rotation of the motor 15 is transmitted. The pulse to be transmitted from the rotary encoder 16 is used to serve as position information in the track direction T in such a manner that one pulse corresponds to a position of 50 $\mu$m of the card holder 6. In accordance with the position information supplied from the above-described rotary encoder 16, the controller 17 issues a control command to the motor servo circuit 14 so that the optical card 1 is conveyed at a predetermined speed between the two ID portions 3A and 3B.

The optical head 5 accommodates a laser diode 5A which emits laser beams used to control writing or reading. The laser beams are made parallel by a collimator lens 5B. Then, the parallel beams are, by a diffraction grating 5C, made into three beams composed of 0-order main beam (sin.) and two sub-beams. The three beams are converged by a converging lens (objective lens) 5E via a prism 5D serving as a beam splitter before they are applied to the surface of the optical card 1. As a result, three beam spots S are formed on the optical card 1 as shown in FIG. 4.

In the main beam tracking state, the spot is formed at the central portion of the track due to the irradiation of the main beam, while two spots are formed on the two side portions of the main beam spot due to the irradiation of the two sub-beams. The spot formed due to the irradiation of the main beam scans data recorded to the surface of the track.

Light beams reflected by the surface of the optical card 1 are converged by the converging lens 5E before a portion of the light beams is reflected by the prism 5D, the portion of the light beams being then made incident upon a photodetector 5F. The photodetector 5F is composed of, for example, four devices consisting of two sectioned devices for receiving the main beam and two devices disposed on the two sides of the two sectioned devices for respectively receiving the sub-beams. A photoelectrically converted output from each of the devices, which constitute the photodetector 5F, is received by an addition/subtraction circuit 20 so as to be subjected to addition and subtraction.

For example, the addition/subtraction circuit 20, to each other, adds the outputs transmitted from the two-sectioned devices, which receive the main beam, so that a signal corresponding to data recorded to the surface of the track, that is, reproduction signal RF, is generated. Furthermore, the addition/subtraction circuit 20 subjects the outputs transmitted from the two-sectioned devices to subtraction so that focus error signal FE is generated which denotes the degree of an error from the focused state of the beam spot converged and applied to the optical card 1. Furthermore, the addition/subtraction circuit 20 subjects the two devices, which respectively receive the sub-beams, to a subtraction so that track error signal TE is generated which denotes the positional deviation from the central portion of the track (in the transverse direction of the track).

The above-described reproduction signal is supplied to a binary & demodulating circuit 18 so as to be converted into a binary number before it is decoded and supplied to the controller 17. The binary signal obtained by the binary & demodulating circuit 18 is supplied to an ID mark detection circuit 31 so as to be used to detect an ID mark. When the ID mark is detected, an ID mark detection signal is supplied to the controller 17 (an ID-mark identifying circuit 17D) and the motor servo circuit 14 (an AND circuit 32 shown in FIG. 5).

The ID-mark identifying circuit 17D, by using the ID mark detection signal, identifies a decode signal which will be supplied from the binary & demodulating circuit 18 in a case where the ID portion is scanned. If the identification is made, the controller 17 (an ID identification circuit 17D of the controller 17) transmits ID confirmation signal IDACK to the motor servo circuit 14 (the AND circuit 32 shown in FIG. 5).

The focus error signal FE and the track error signal TE are supplied to a focus & track servo circuit 19 so that focusing control signal FC for maintaining the converging lens 5E at a focus state is generated from the focus error signal FE and the track error signal TE. Furthermore, the track servo circuit 19 generates tracking control signal TC for maintaining the tracking state in such a manner that the beam spot formed on the optical card 1 follows up the track.

The above-described control signals FC and TC are respectively supplied to a focusing coil 7a and a tracking coil 7b of a lens driving means 5G so that the converging lens 5C is driven and controlled in the focusing direction (the longitudinal direction of FIG. 4) and the tracking direction (the vertical direction of the sheet on which FIG. 4 is drawn). As a result, light to be applied to the track formed in the track of the optical card 1 always follows up the above-described track while being focused. The tracking control signal TC is supplied to the tracking coil 7b via a switch SW2, the switching operation of which is controlled by the controller 17.

The above-described controller 17 rotates a head moving motor 22 via an optical head drive circuit 21 when moving the optical head 5 to seek an arbitrary track after a presetting operation has been performed so as to move the optical head 5 in direction (hereinafter called a "track transversal direction" or a "track crossing direction") CT (vertical direction of the drawing sheet on which FIG. 4 is drawn) which intersects the track. Simultaneously with the above-described movement, the beam to be applied to the optical card 1 is moved in the track transversal direction CT. That is, the head motor 22 serves as a means for relatively moving the light beam in the track transversal direction CT.

The head motor 22 rotates, for example, a spiral thread 8 clockwise or counterclockwise to which the optical head 5 (its housing) is fastened so as to move the optical head 5 in the track transversal direction CT.

The amount of the movement of the optical head 5 is detected by a rotary encoder 23 fastened to the motor 22 so that an output from the rotary encoder 23 is, via the optical head driving circuit 21, transmitted to the controller 17.

In the data reproduction mode, the controller 17, via a laser driving circuit 24, causes a laser diode 5A to emit a low-power reading beam as well as controlling the operations of the motor servo circuit 14, the binary & demodulating circuit 18 and the focus/track servo circuit 19. As a result, seeking of a desired track is made in accordance with track address information demodulated by the binary & demodulating circuit 18 to control reading of data.

In the data writing mode, the controller 17, similarly to the data reproduction mode, seeks a track, onto which data is desired to be written, before it causes the laser diode 5A via the laser driving circuit 24 to emit high power writing beam to the subject track so that data is written. In this case, data to be recorded passes through a modulating circuit 25 forming a modulated circuit. The modulated circuit is, via the laser driving circuit 24, supplied to the laser diode 5A so that the laser diode 5A emits pulse-formed light at either high or low power in accordance with the binary level of the modulated signal. Data to be recorded is, via the controller 17, transmitted to the modulating circuit 25 from a host apparatus (omitted from illustration) such as a computer.

Then, the structure of the motor servo circuit 14 will now be described with reference to FIG. 5.

When a command for controlling a driving direction signal (a signal denoting the forward direction or the reverse direction) is supplied from the controller 17 to a ROM 36 which constitutes the motor servo circuit 14, either of two regions of the ROM 36 is selected. The ROM 36 is sectioned into two regions composed of a region which stores speed data VD1 for use when the card holder 6 (into which the optical card 1 is loaded) is conveyed in the forward direction and a region which stores speed data VD2 for use when the card holder 6 is conveyed in the reverse direction.

The address of the ROM 36 corresponds to the positions of the card holder 6 which are arranged apart from each other by a distance of 50 $\mu$m. Drive data (aiming speed) for each address is supplied to the conveyance motor 15 via a D/A converter 37 and a power amplifier 38 so that the card holder 6 is conveyed.

The output denoting the phase-A and the phase-B transmitted from the rotary encoder 16 fastened to the rotary shaft of the motor 15 is supplied to a direction discriminator 39. In response to an output signal transmitted from the direction discriminator 39 and denoting the conveyance direction and the position of the card holder 6, the value of an up/down counter 40 which indicates the position of the card holder 6 with respect to the optical head 5 is updated. Furthermore, the difference from an aiming value is calculated by a subtractor 42 via an F/V converter 41 so that speed is controlled in such a manner that the above-described difference is made zero.

Output data from the ROM 36 is arranged in such a manner that, when the card holder 6 has passed the acceleration region, that is, when the value of the up/down counter 40 exceeds a value which corresponds to the length of the acceleration region, it is converted from acceleration data into a predetermined speed data. When the same has passed through the predetermined speed region and moved into a deceleration region, the output data is converted from the predetermined speed data into deceleration data. When the value of the up/down counter 40 becomes a predetermined value, data denoting the fact that the speed is zero is transmitted to stop the conveyance of the card holder 6.

Figure 6:
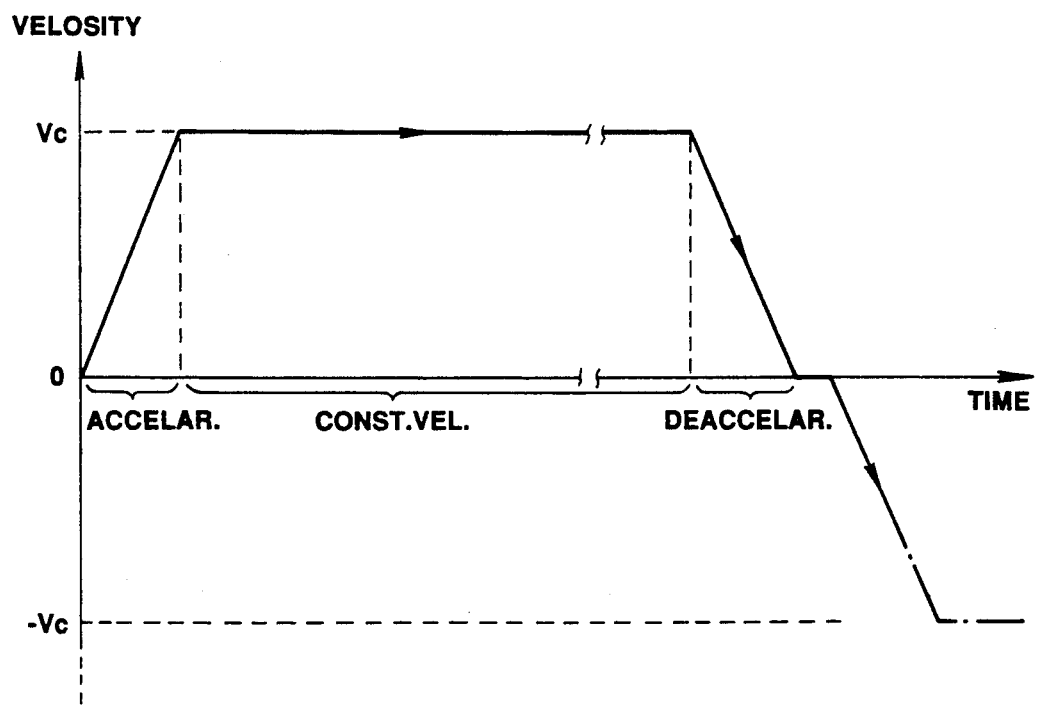

FIG. 6 illustrates an example of the speed of the card holder 6 which is controlled in accordance with output data from the ROM 36, wherein Vc denotes the speed which is controlled by the motor servo circuit 14. In a case where recording or reproducing to and from the subject track is being performed after the presetting action, substantially the overall side from an end portion to another end portion of the optical card 1 is scanned before the speed is decelerated to zero. When the speed is zero, jumping to a neighbor track is performed before the level of the drive directional signal to be supplied to the ROM 36 is reversed so that the motor 15 is reversely rotated. The card holder 6 is set to predetermined speed - Vc as designated by an alternate long and short dash line so that the optical head 5 relatively scans the subject track from the reverse direction.

Then, a means relating to an operation for detecting the ID mark which serves as the reference position of the optical card 1 with respect to the optical head 5 and the presetting operation to be performed in accordance with the above-described ID mark detection will now be described.

The ID mark detection circuit 31 detects the ID mark of the ID portions 3A and 3B in response to the binary signal read by the optical head 5 and transmitted from the binary & demodulating circuit 18 so as to transmit a signal denoting the ID mark to the AND circuit 32. For example, the above-described detection of the ID mark is performed in such a manner that the binary signal is caused to pass through a shift register 31A and furthermore a comparison is made in a comparator 31B such that whether or not the parallel output from the shift register 31A coincides with pattern data stored in a pattern recording portion 31C for recording the pattern data of the ID portions 3A and 3B.

In addition, a preset data memory 33 is, by the controller 17, caused to store preset data about the position of the ID portions 3A and 3B of the optical card 1. Preset data stored in response to a preset data select signal supplied from the controller 17 is supplied to a presetting terminal of the up/down counter 40 so as to be loaded in response to the output from the AND circuit 32. Therefore, the counter 40 increases or decreases the count from preset data when the loading signal is supplied from the AND circuit 32 to the counter 40.

Furthermore, a predetermined-speed detection circuit 34 decodes the output from the up/down counter 40 and as well as discriminates whether or not, for example, a signal decoded at a predetermined time coincides with a predetermined value to detect the speed (designated by Vc or −Vc of FIG. 6) at which the card holder 6 is conveyed by the motor servo circuit 14, that is, the moment at which the speed is raised to a predetermined speed which is suitable for the recording/reproducing operation.

Also the output from the predetermined-speed detection circuit 34 is supplied to the AND circuit 32. Furthermore, ID confirmation signal IDACK transmitted from the controller 17 is supplied to the above-described AND circuit 32. In a case where a signal denoting the result of the logical product is detected, the preset data is set to the up/down counter 40 so that the reliability of the presetting operation is improved.

In addition, the output signal from the above-described AND circuit 32 is supplied to a latch circuit 35 which serves as a preset error discrimination means. The latch circuit 35 transmits preset OK signal PROK denoting the fact that the presetting operation has been succeeded to a discriminating portion 17B of the controller 17.

The controller 17 discriminates in the discriminating portion 17B thereof that the presetting operation has failed if the preset OK signal PROK is not supplied in a predetermined time set by a timer 17A from the time at which the presetting operation has been commenced. In a case where the discrimination has made that the presetting operation has been failed, the controller 17 reads out retry data stored in the retry data recording portion 17C for recording retry data about the presetting operation. In accordance with the retry data, the controller 17 transmits movement command signal MO for moving the optical head 5 to the head motor drive circuit 21. The head motor drive circuit 21 moves the optical head 5 to another track when the movement command signal MO is supplied. Thus, the presetting operation is retried on the track to which the optical head 5 has been moved.

The latch circuit 35 is arranged in such a manner that is cleared immediately before the presetting operation in response to preset clear signal PRCLR. For example, a signal denoting a fact that the switch SW1 has been switched on may be used as the preset clear signal PRCLR.

Figure 7:
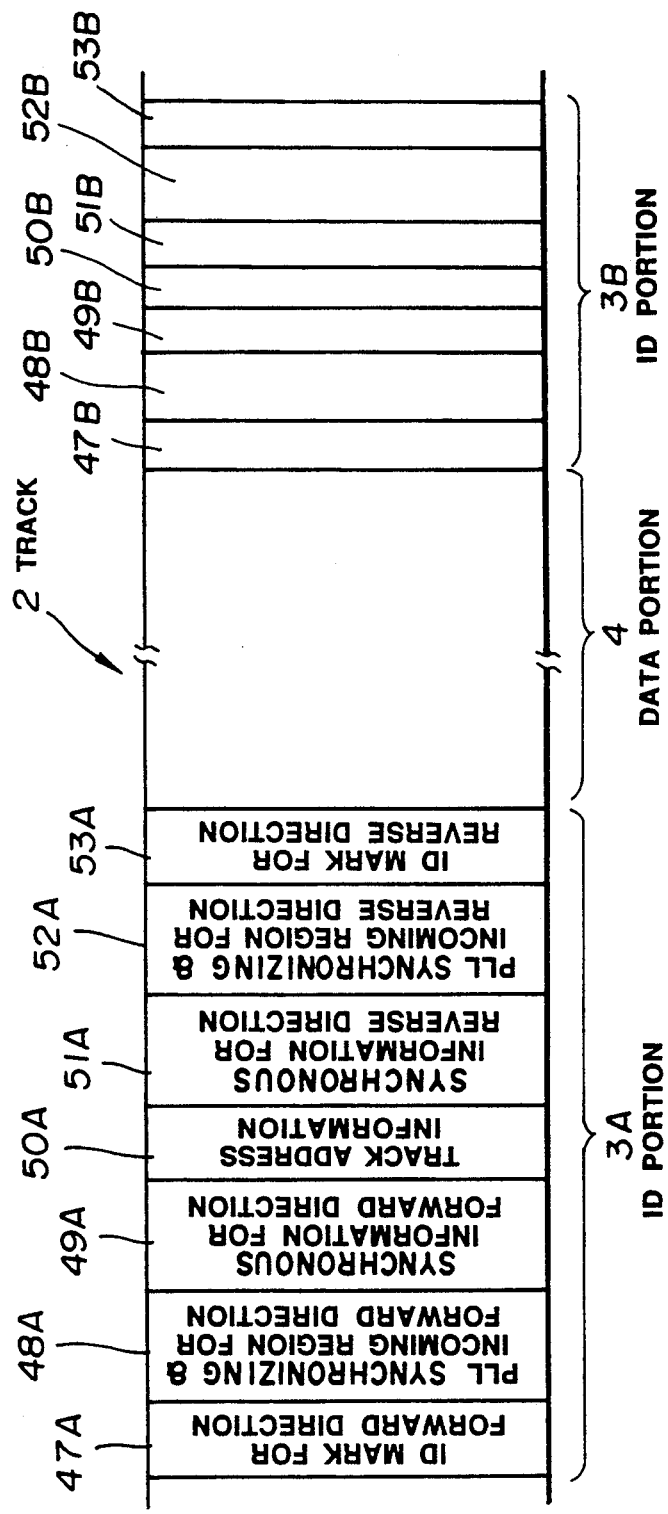

FIG. 7 illustrates the track format of the optical card 1 according to the first embodiment. The track format for each of the ID portions 3A and 3B according to this embodiment is constituted in such a manner that track address information can be read in both the forward direction and the reverse direction.

The left-hand ID portion 3A comprises, when viewed from the left portion of FIG. 7, a forward directional ID mark 47A which shows the start point of the ID portion and which acts at the time of the forward directional reading operation, a PLL synchronizing and incoming region 48A which acts at the time of the forward directional reading operation, a synchronous information portion 49A which denotes the starting point of track address information portion and which acts at the time of the forward directional reading operation, a track address information portion 50A, a synchronous information portion 51A which denotes the starting point of track address information and which acts at the time of the reverse directional reading operation, a PLL synchronizing and incoming region 52A which acts at the time of the reverse directional reading operation and an ID mark 53A which denotes the starting point of the ID portion and which acts at the time of the reverse directional reading operation.

Similarly to the left-hand ID portion 3A, the right-hand ID portion 3B comprises, when viewed from the left portion of FIG. 7, a forward directional ID mark 47B which shows the start point of the ID portion and which acts at the time of the forward directional reading operation, a PLL synchronizing and incoming region 48B which acts at the time of the forward directional reading operation, a synchronous signal 49B which denotes the starting point of track address information portion and which acts at the time of the forward directional reading operation, a track address information portion 50B, a synchronous signal 51B which denotes the starting point of track address information and which acts at the time of the reverse directional reading operation, a PLL synchronizing and incoming region 52B which acts at the time of the reverse directional reading operation and an ID mark 53B which denotes the starting point of the ID portion and which acts at the time of the reverse directional reading operation.

In the track address information portions 50A and 50B, serial data modulated from left to right in accordance with a modulation rule is recorded. Therefore, in the forward directional motion, the track address information portions 50A and 50B are ordinarily modulated to reproduce track address information. In the reverse directional motion, the track address information is reproduced in the reverse sequence to the ordinary modulation.

The controller 17 moves the optical head 5 to a predetermined position such as a home position formed in the optical recording portion 3 when it detects the fact that the optical card 1 has been loaded into the card holder 6. Furthermore, it turns on the focus servo and the track servo, clears the up/down counter 40 and supplies the drive direction signal to the motor servo circuit 14 in order to cause the card holder 6 to be conveyed in the forward direction. The motor servo circuit 14 drives the motor in response to the above-described signal to convey the card holder 6. When the speed of the accelerated card holder 6 has been raised to a speed level which is suitable to perform the recording or the reproducing operation, it is detected by the predetermined-speed detection circuit 34.

Then, the presetting operation according to this embodiment will now be described. (a) In a case where the relative distance between the optical card 1 loaded into the card holder 6 and the optical head 5 is long enough beyond the acceleration region with respect to the left-hand ID portion 3A:

In this case, the ID mark 47A is detected by the ID mark detecting circuit 31 after the predetermined-speed position is detected by the predetermined-speed detection circuit 34. The controller 17 reads the track address information 50A after the ID mark 47A has been detected and transmits ID confirmation signal IDACK for a predetermined time in which the card holder 6 passes through the ID portion 3A.

Furthermore, the controller 17 is able to recognize the ID portion 3A in accordance with the track address information 50A (since information denoting the ID portion 3A is included). Therefore, the controller 17 transmits a preset data select signal so as to make the output from the preset data memory 33 to be a value which corresponds to the position of the ID mark 53A. This embodiment may be arranged in such a manner that, for example, ID confirmation signal IDACK is, as designated by a dashed line of FIG. 5, also used as the preset data select signal.

When the ID mark 53A is detected by the ID mark detection circuit 31, the output from the AND circuit 32 becomes active and the value of the preset memory 33 is set to the up/down counter 40. As a result of the above-described operation, the position of the optical card 1 with respect to the optical head 5 can be detected. Therefore, an error which occurs at the time of the operation of loading the optical card 1 with respect to the card holder 6 can be corrected. That is, the position of the optical card 1 with respect to the card holder 6 can be corrected. When the AND circuit 32 has become active, the latch circuit 35 latches "H" data to transmit it as preset OK signal PROK to the discriminating portion 17B of the controller 17 so that a discrimination is made that the presetting operation has been completed normally. Therefore, the operation can be allowed to proceed to the ensuing operation such as recording and reproducing. (b) In a case where the relative distance between the optical card 1 loaded into the card holder 6 and the optical head 5 is not great enough to secure the accelerating region with respect to the ID portion 3A:

In this case, since the card holder 6 is being accelerated, the ID portion 3A cannot accurately be demodulated. Therefore, the ID confirmation signal IDACK cannot be transmitted from the ID portion 3A and, therefore, the value of the preset data memory 33 is not set to the up/down counter 40. The card holder 6 is brought to a predetermined-speed state in the data portion 4 and the fact that it has been brought to the predetermined-speed position is detected by the predetermined-speed detection circuit 34. Then, the controller 17 detects the ID mark 47B of the right-hand ID portion 3B before it reads the track address information 50B so that it transmits the ID confirmation signal for a predetermined time.

The controller 17 is able to recognize the fact that the subject portion is the ID portion 3B from the track address information 50B. Therefore, the controller 17 transmits the preset data select signal so as to make the output from the preset data memory 33 to be a value which corresponds to the position of the ID mark 53B.

When the ID mark 53B is detected by the ID mark detection circuit 31, the output from the AND circuit 32 is brought into the active state. Therefore, the value of the preset data memory 33 is set to the up/down counter 40. As a result, the error which occurs at the time of the loading operation of the optical card 1 with respect to the card holder 6 can be corrected. Since preset OK signal PROK is transmitted, the sequence can be shifted to the next operation.

(c) In a case of b in which dust or the like is further present at an intermediate portion of the ID portion 3B:

Since the presetting operation is failed in this case, preset OK signal PROK is not transmitted. As a result, the controller 17 rotates the moving motor 22 via the optical head driving circuit 21 so that the optical head is moved by, for example, 5 mm in the track transversal direction CT which intersects the track. Then, the controller 17 again moves the card holder 6 to repeat the presetting operation. Since the defect present on the optical card 1 is usually limited to about 1 mm, the optical head 5 is removed from the track at which the retrial operation has failed. Therefore, the probability that the presetting operation will succeed is increased.

That is, the structure according to Japanese Patent Laid-Open No. 2-154364 is able to work as desired in the above-described cases (a) and (b). However, it is difficult for the same to succeed in the presetting operation even if the presetting operation is repeated in a case where dust or a flaw is present on the track to which presetting is made. However, according to the first embodiment, retrying is made in such a manner that the movement to another track is performed while deviating from the portion in the vicinity of the track in which the presetting operation has been failed. Therefore, the probability that the presetting operation will succeed is increased.

Figure 8:
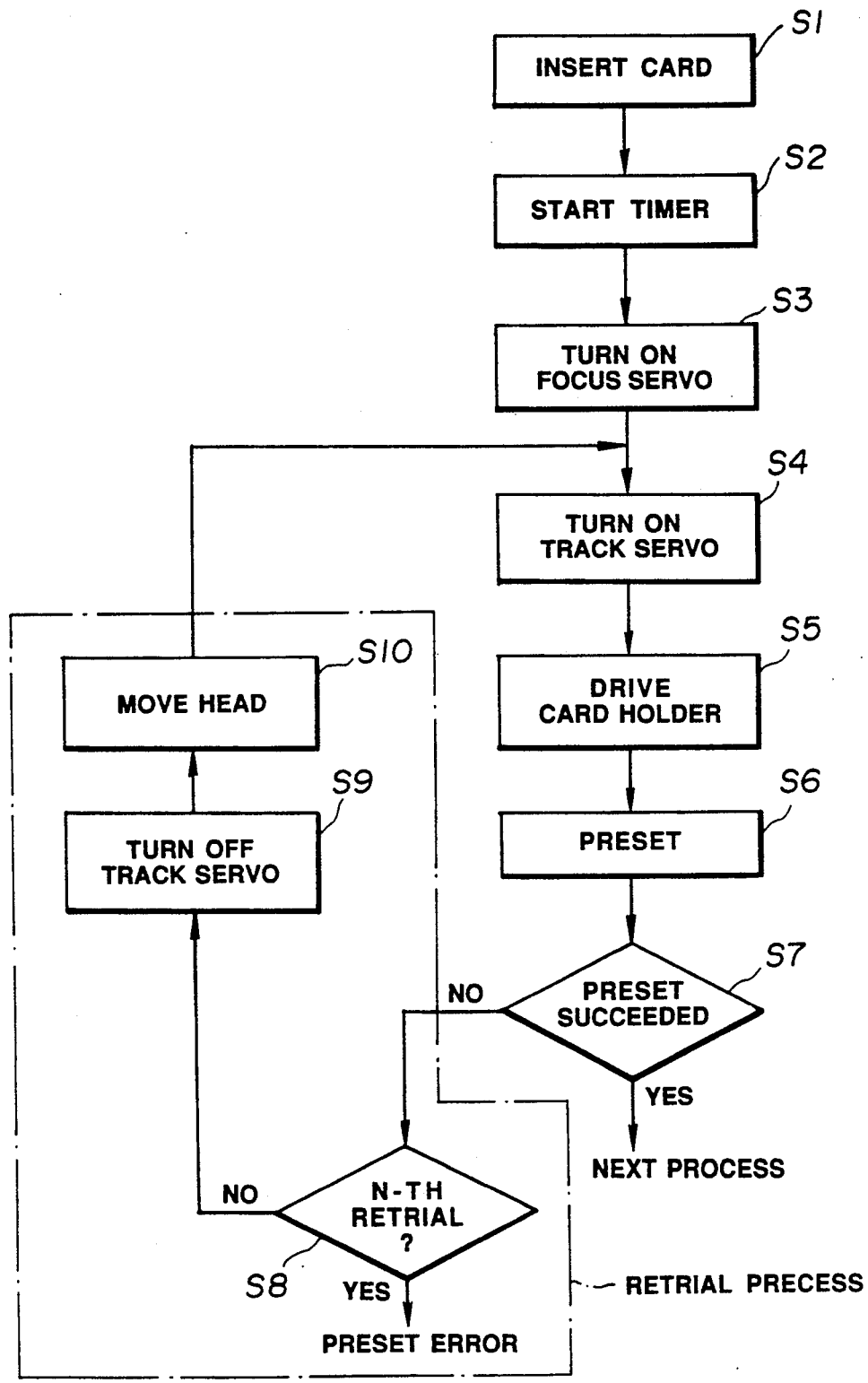

FIG. 8 illustrates the contents of the presetting operation according to this embodiment.

When the optical card 1 is inserted into a predetermined position of the card holder 6 in step S1, the timer 17A is started as shown in step S2. Furthermore, the focus servo is turned on in step S3. Then, in step S4, the track servo is turned on so that a state is realized in which the adjacent track is followed up. Then, in step S5, the card holder 6 is driven (conveyed) so that the presetting operation is performed in step S6 in the above-described state of driving. Then, a discrimination is (in step S7) made whether or not the presetting operation has succeeded or failed such that preset OK signal PROK has been transmitted in a predetermined time set by the timer 17A. If the same has succeeded, the operational sequence proceeds to the next operation (for example, the recording or the reproducing operation).

If the presetting operation has failed, the retrial of the presetting operation is performed. First, a discrimination that the subject retrial is the N-th time (N can be predetermined) is made (step S8). If it is not the N-th time, a process in which the track servo is turned off is performed in step S9. Then, the flow proceeds to step S10 in which the optical head 5 is moved in the track transversal direction CT which intersects the track.

Then, the flow proceeds to step S4 in which the track servo is turned on to realize a state in which the track adjacent to the position, to which optical head 5 has been moved, is followed up before next step S5 is repeated.

If the retrial is the N-th time in step S8, it can be considered that presetting has not failed due to the defects on the surface of the optical card 1 but the same has failed due to, for example, a breakdown of the apparatus. Therefore, a discrimination is made that a preset error has occurred and a predetermined process arranged to be performed if an error has occurred.

According to the first embodiment, even if the operation (the apparatus error correction) of correcting the position of the optical card 1 with respect to the portion including the optical head 5 fails on a certain track due to dust or a defect on the surface of the track, the position correction is again performed at another track by moving the optical head 5. Therefore, the probability that the position is again corrected on another track in which dust or a defect is present can be improved. Therefore, the probability that the position correction succeeds can be improved.

As a result, the optical card which cannot be subjected to recording or reproducing according to the conventional technology can be subjected to the same. In particular, the optical card from which data cannot be reproduced according to the conventional technology can be subjected to the reproducing process. Therefore, the possibility of reproducing precious data can be improved.

Figure 9:
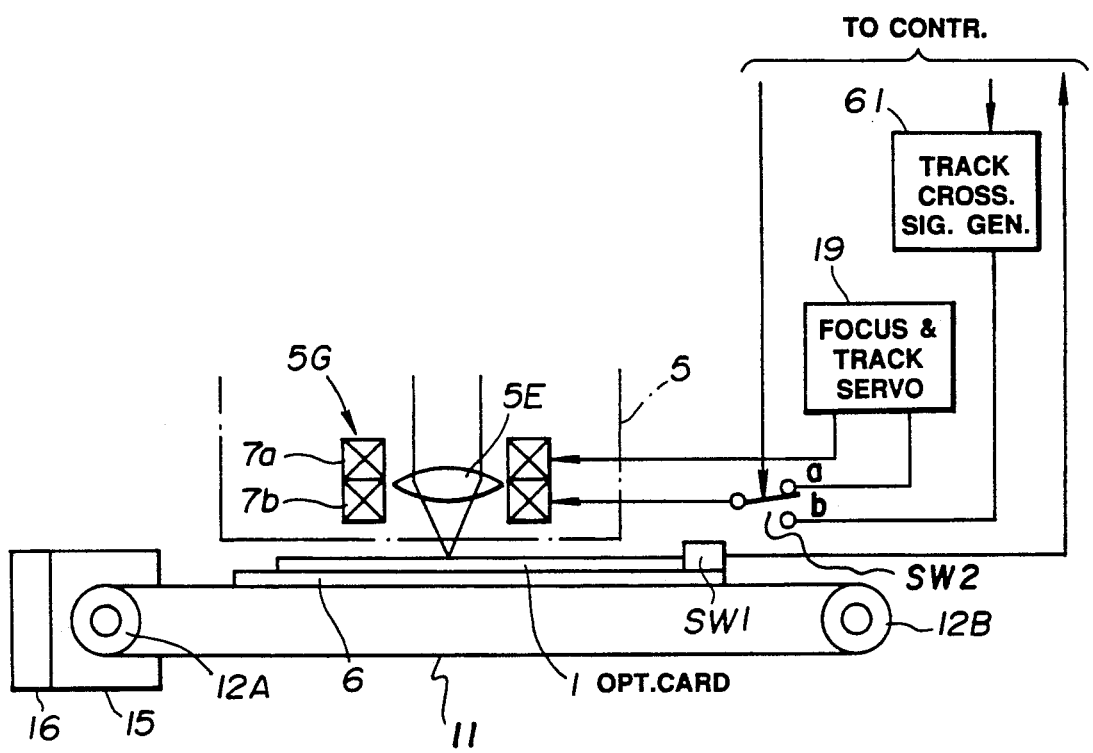
FIG. 9 is a structural view which illustrates the structure of an essential portion of the optical card apparatus according to a modification to the first embodiment.

FIG. 9 illustrates an essential portion of a modification to the first embodiment of the present invention. This modification is arranged in such a manner that, if the preset operation fails, the controller 17 (its discriminating portion 17B) switches over the switch SW2 from contact a to b in place of driving the head motor 22 so as to supply the track transversal signal transmitted from a track transversal signal generating circuit 61 to a tracking coil 7b. As a result, the converging lens 5E is moved in the track transversal direction CT so that the beam is moved to another track.

Figure 10:
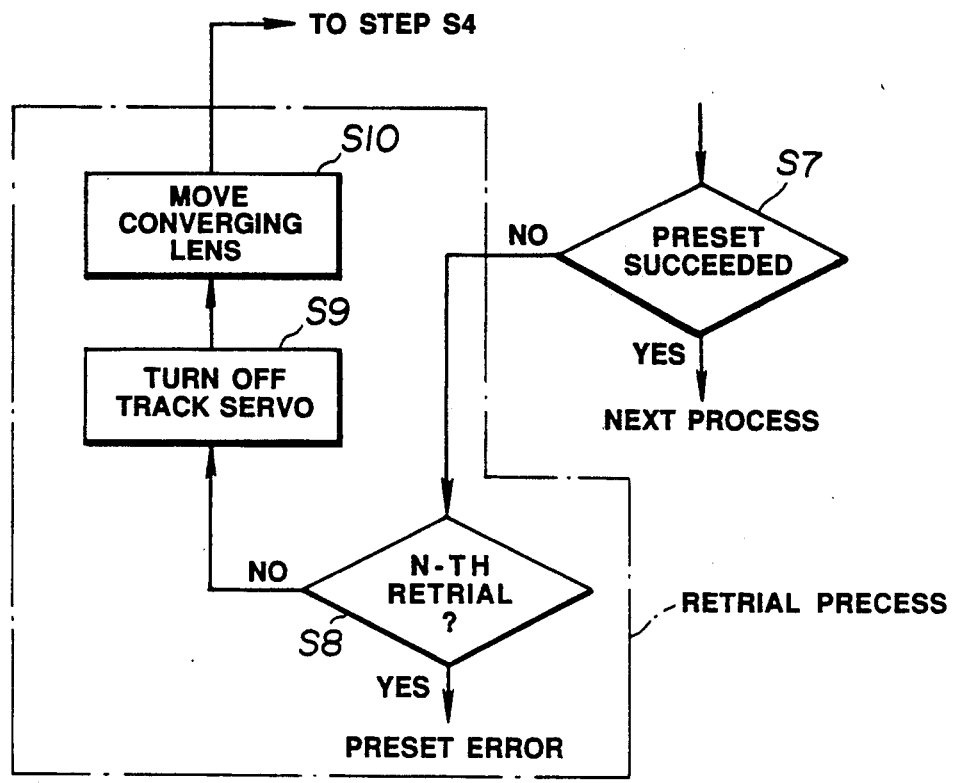
FIG. 10 is a flow chart which illustrates a portion for performing retrial of the presetting operation according to the modification.

Therefore, according to this modification, the process in step S10 shown in FIG. 8 is modified in such a manner that the drive signal is supplied to the tracking coil 7b of the lens driving means 5G in place of the process in which the optical head 5 is moved. As a result, the beam spot is moved to a track which is different from the track to which the presetting operation has failed so as to the presetting operation is again performed on the above-described track. FIG. 10 shows the retrial of the presetting operation.

Another structure may be employed which is a combination of proper factors arranged such that, if the preset operation has failed, the lens driving means 5G is first driven and a larger movement is made by the optical head to perform the retrial.

Although the structure shown in FIG. 8 is arranged in such a manner that the presetting operation is again performed by moving the optical head 5 in a case where the presetting operation has failed (except for the case in which the N-th retrial), another structure may be employed which is arranged in such a manner that, if the presetting operation has failed in spite of performing plural times of retrial operations while remaining the position of the optical head 5, the optical head 5 or the like is moved to perform the retrial on another track.

Figure 11:
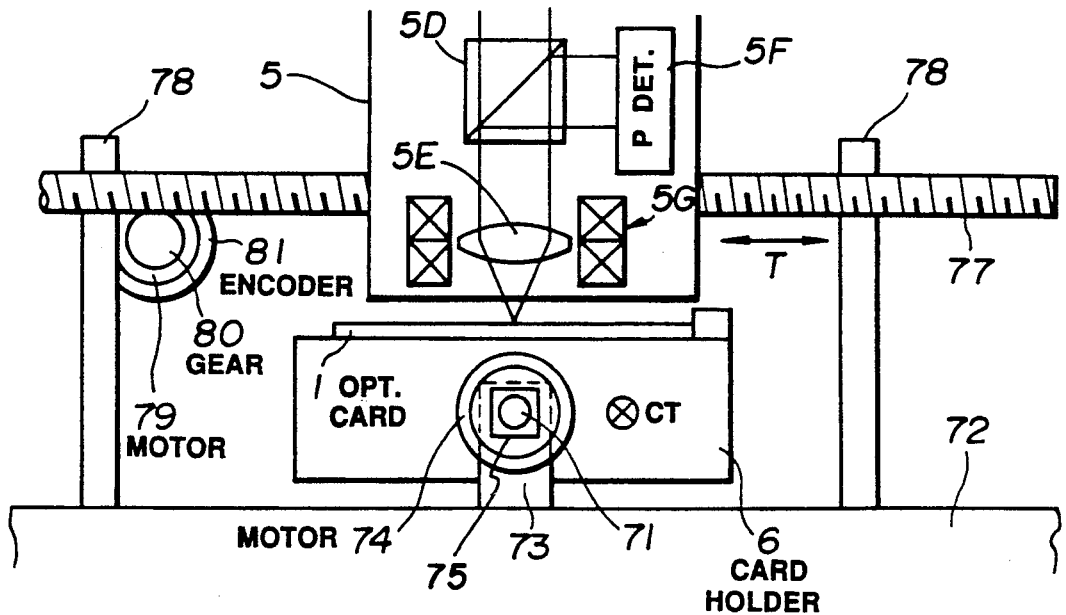
FIG. 11 is a structural view which illustrates the structure of an essential portion of the optical card apparatus according to a second embodiment of the present invention.

FIG. 11 illustrates a portion of a second embodiment of the present invention. According to this embodiment, the card holder 6 into which the optical card 1 is loaded is moved in the track transversal direction CT to convey the optical head 5 in the track direction T. The two end portions of a screw 71 secured to the card holder 6 are, by the thread, received by thread holes formed in support columns 73 stood erect on the base 72. Furthermore, the rotational shaft of a motor 74 is secured to an end portion of the screw 71. In addition, a rotary encoder 75 is fastened to the rotational shaft of the motor 74.

The above-described screw 71 is made to project in a direction perpendicular to the track of the optical card 1. As a result, the card holder 6 is moved in the track transversal direction CT by the motor 74.

On the other hand, the two end portions of a screw 77 secured to the optical head 5 are, by the thread, received by thread holes of supporting columns 78 stood erect on a base 72. The screw 77 is, by the thread, engaged with a gear 80 fastened to the rotational shaft of a motor 79. When the motor 79 is rotated, the screw 77 is moved in its longitudinal direction. Furthermore, a rotary encoder 81 is fastened to the rotational shaft of the above-described motor 79. In addition, the motor 79 is secured to a supporting column stood erect on the base 72.

The above-described screw 77 is made to project in the track direction T running parallel to the track of the optical card 1. As a result, the optical head 5 is moved in the track direction T by the motor 79.

The rotation of the above-described motor 74 is controlled by the motor driving circuit 21 shown in FIG. 4, while that of the motor 79 is controlled by the motor servo circuit 14.

Although the first embodiment is arranged in such a manner that the card holder 6 is conveyed in the track direction T and the optical head 5 is moved in the track transversal direction CT, the second embodiment is arranged in such a simple manner that the card holder 6 is moved in the track transversal direction CT and the optical head 5 is conveyed in the track direction T. The other structures are the same as those according to the first embodiment. The operation and the effect obtainable from to this embodiment are the same as those obtainable from the first embodiment.

As described above, according to the first and the second embodiments, the optical head 5 or the like is moved if the preset operation fails to move at least the light beam in the track transversal direction CT so as to perform the retrial on another track. Therefore, even if an error has occurred at the time of the presetting operation due to a defect on the surface of the optical card 1, the probability of recovery by means of the retrial can be improved to perform the ensuing normal recording operation.

In general, the conventional optical card apparatus is arranged in such a manner that the home position recovery operation is performed at a predetermined and relatively slow speed. Therefore, it takes too long time for the home position recovery operation to be completed in a case where the amount of the movement of the head carriage is great at the time of the home position recovery operation. That is, the conventional optical apparatus is arranged in such a manner that the home position recovery operation is always performed by the same process. Therefore, similarly to a case where the positional relationship between the optical head and the home position is not known at the time of the power supply or the like, the head carriage is moved toward the home position at a predetermined speed in a case where tracking has been disrupted due to dust or a flaw of the optical card and thereby the optical head has run away or in a case where the positional relationship between the optical head and the home position is substantially known at the time of the commencement of the home recovery operation in the recording/reproducing mode or the card insertion/discharge mode. Therefore, there arises a problem in that a too long time takes to complete the home recovery operation in a case where the head carriage is positioned away from the home position.

Then, the description will be made about an information recording and reproducing apparatus in which the time required to complete the home position can be shortened in a case where the positional relationship with the home position is substantially known.

Figure 12:
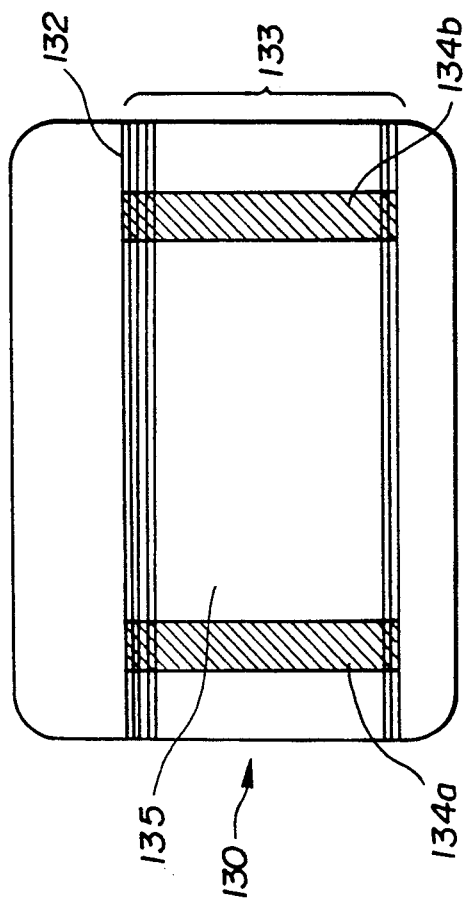
FIG. 12 illustrates the structure of the optical card.

As shown in FIG. 12, an optical card 130 serving as a recording medium has a track 132 extending in the longitudinal direction of the card, the track 132 having a plurality of recording regions 133 formed in the widthwise direction (in the minor side direction) of the optical card 130. The recording region 133 has, on the two end portions of the minor side thereof, ID portions 134a and 134b to which information about the address which corresponds to each track is recorded so that the ID portions 134a and 134b can be read from in the opposite directions. Furthermore, a data portion 135 is formed between the above-described ID Portions 134a and 134b.

Therefore, in a case where the optical card 130 is, with respect to a head carriage to be described later, moving from left to right in FIG. 12 along the track, the ID portion 134a is read to recognize address information corresponding to the track. Furthermore, in a case where the optical card 130 is, with respect to the head carriage, moving from right to left in FIG. 12 along the track, the ID portion 134b is read to recognize address information corresponding to the track.

The above-described ID portion 134a and 134b are formed inside away from the end portion of the optical card 130 by a predetermined distance (for example, about 4 mm) in order to prevent the influence of the flaw or contamination in the end portion of the card 130 and as well as to satisfactorily stable the relative speed between the optical card 130 and the optical head in the track direction. The ID portions 134a and 134b are previously formatted when the optical card 130 is manufactured.

Figure 13:
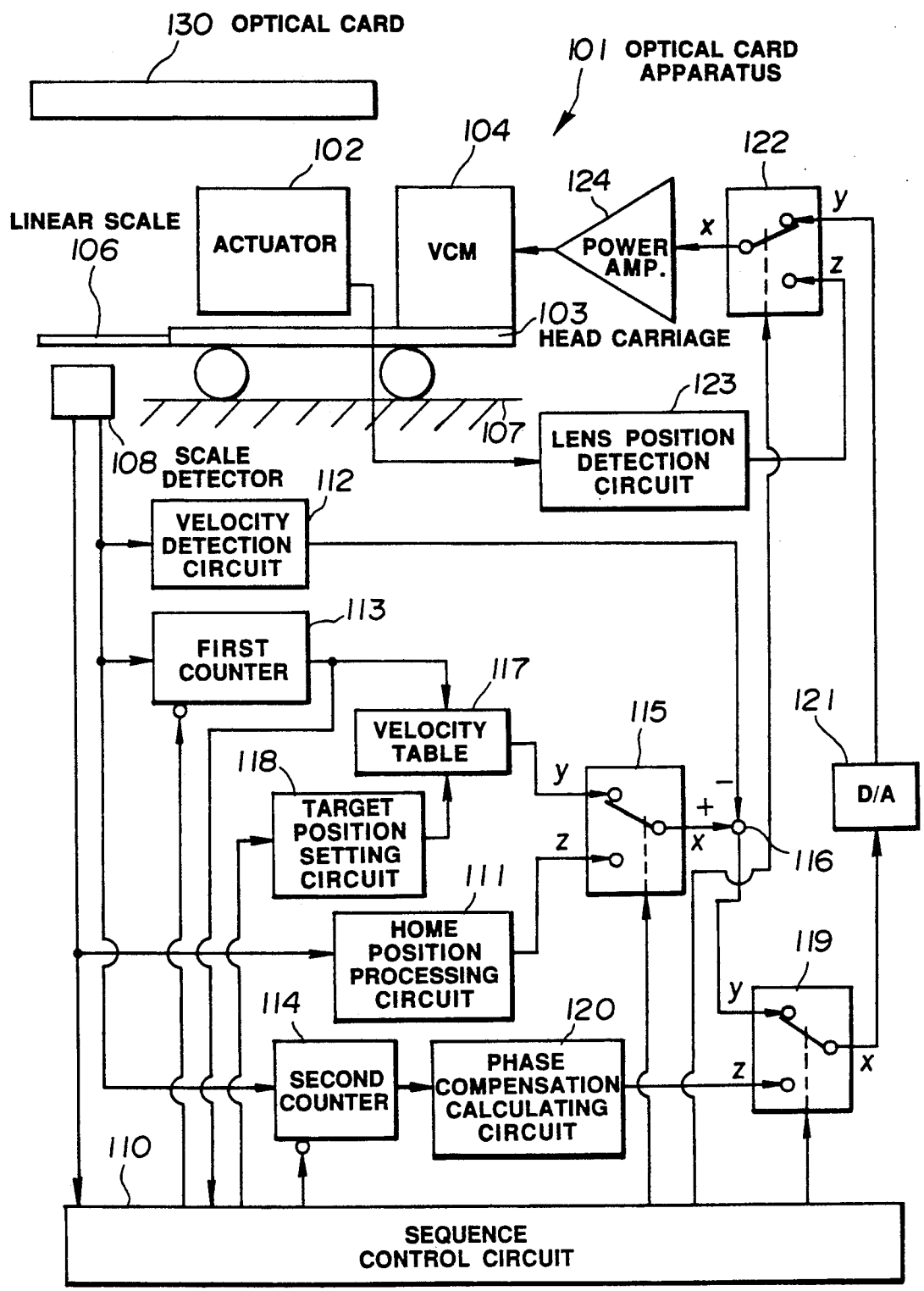
FIG. 13 is a schematic structural view which illustrates an information recording/reproducing apparatus.

As shown in FIG. 13, the optical card apparatus 1 serving as the information recording and reproducing apparatus has an actuator 102 for causing recording/reproducing beam to be applied to the optical card 130. The actuator 102 is structured in such a manner that an optical spot is applied to the surface of the optical card 130 via an optical system composed of a light source, an objective lens, and the like (omitted from illustration). Furthermore, the actuator 102 is fastened to a head carriage 103. In addition, the actuator 102 is driven by a voice coil motor (VCM) 104 mounted on the head carriage 103 in such a manner that it is able to be moved in a direction substantially perpendicular to the track 132 of the optical card 130.

Furthermore, a linear scale 106 is fastened to the head carriage 103, the linear scale 106 is combined with a scale detector 108 which serves as a home position detection means fastened to a frame 107 to which the head carriage 103 is movably fastened. As a result, the linear scale 106 is able to detect the home position (H) serving as the reference position and to detect the position change.

Figure 14:
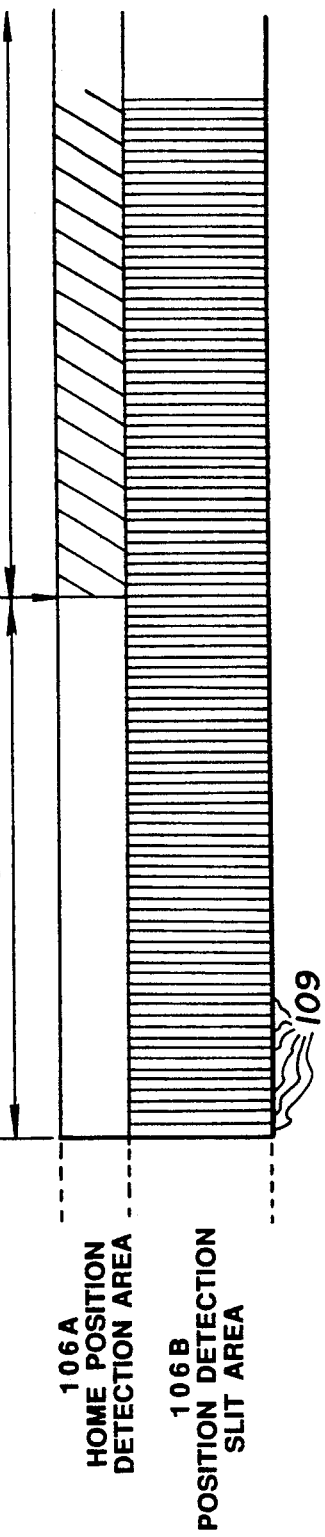
FIG. 14 is a schematic structural view which illustrates a linear scale.

As shown in FIG. 14, the linear scale 106 comprises a home position detection area 106A having a bright and dark pattern showing the home position and a position detection slit area 106B having a plurality of slits 109 for detecting the position change in the direction substantially perpendicular to the track 132 of the optical card 130. The light and bright pattern of the linear scale 106 is arranged in such a manner that it is changed at, for example, the central portion of the major side of the linear scale 106, the change position of the bright and dark pattern being made to be the home position.

The above-described home position is arranged in such a manner that it corresponds to, for example, the central portion of the minor side of the optical card 132. The scale detector 108 is arranged to transmit a pattern signal, which corresponds to the bright and dark state of the pattern of the linear scale 106 to a sequence control circuit 110 and a home speed processing circuit 111. The sequence control circuit 110 detects the change point of the bright and dark pattern to recognize the fact that the head carriage 3 is positioned at the home position.

The position change is detected in accordance with the known moire fringe principle by means of the slits 109 of the linear scale 106 and sub-slits (omitted from illustration) formed on the scale detector 108. That is, the scale detector 108 detects the position change in the direction substantially perpendicular to the track 132 of the optical card 130 to transmit the position displacement signal to a speed detection circuit 112, a first counter 113 and a second counter 114.

The home speed detection circuit 111 detects the right side or the left side (designated by symbol a or b of FIG. 14) on which the actuator 102 is positioned with respect to the home position in response to the pattern signal transmitted from the scale detector 108. The home speed detection circuit 111 then transmits an aiming speed signal for moving the head carriage 103 to the home position to the z-side input of a speed changing circuit 115.

The speed detection circuit 112 detects the present moving speed of the head carriage 104 in accordance with the position displacement signal transmitted from the scale detector 108 so as to supply it to a speed calculating circuit 116. On the other hand, the first counter 113 receives a resetting signal supplied from the sequence control circuit 110 at the time of the power supply. Furthermore, it detects the present position change of the head carriage 103 while making the position to which the above-described reset signal is supplied to be the reference position so as to transmit the result of the detection to the sequence control circuit 110 and a speed table 117 serving as a speed pattern generating means.

The aiming position, which is set by the sequence control circuit 110 and to which the head carriage 103 is moved at the time of the seeking operation, is set to an aiming position setting circuit 118 to transmit a signal denoting the set position to the speed table 117. The speed table 117 generates a signal denoting the difference in the present position transmitted from the first counter 113 and the aiming position transmitted from the aiming position setting circuit 118, that is, an aiming speed signal determined in accordance with the distance to the aiming position so as to transmit it to y-input terminal of the above-described speed changing circuit 115. In response to the instruction issued by the sequence control circuit 110, the speed changing circuit 115 selects the aiming speed signal to the home position transmitted to the home speed processing circuit 111 or the aiming speed signal transmitted from the speed table 117 so as to transmit the selected signal to the speed calculating circuit 116 via an x-output terminal. The speed calculating circuit 116 subtracts the present speed signal transmitted from the speed detection circuit 112 from the aiming speed signal transmitted from the x-output terminal of the speed changing circuit 116 so as to transmit it as a speed error signal to a y-input terminal of a speed/position switching circuit 119.

The second counter 114 counts the position displacement signal transmitted from the head carriage 103 from the position to which the reset signal is supplied from the sequence control circuit 110 so as to detect the position displacement of the head carriage to transmits the result to a phase compensating and calculating circuit 120. The sequence control circuit 110 supplies a reset signal to the second counter 114 when the head carriage 103 has reached the aiming position at which the head carriage 103 must be stopped.

The phase compensating calculating circuit 120 performs calculations to make the head carriage 103 to be positioned at the aiming position in accordance with the output denoting the difference between the aiming position and the present position. An output signal denoting the result of the calculations is supplied to a z-input terminal of the speed/position switch circuit 119.

The speed/position switch circuit 119 selects the speed error signal transmitted from the speed calculating circuit 116 or the position displacement signal transmitted from the phase compensating and calculating circuit 120 in accordance with the instruction issued from the sequence control circuit 110. The selected input signal is transmitted to a digital/analog (D/A) converter 121 via the x-output terminal.

The D/A converter 121 converts a digital output signal transmitted from the speed/position switching circuit 119 into an analog signal so as to transmit it to the y-input terminal of the position control switching circuit 122. A lens position detection circuit 123 detects the position of an object lens included in the actuator 10 so as to transmit a signal for controlling the position of the head carriage 3 to the z-input terminal of the position control switching circuit 122 so that the displacement of the object lens can be minimized.

In response to an instruction issued from the sequence control circuit 110, the position control switch circuit 122 selects a lens position signal transmitted from the lens position detection circuit 123 or a signal transmitted from the D/A converter 121 so as to transmit the selected signal to a power amplifier 124 via the x-output terminal. The power amplifier 124 drives a VCM 104 with an electric current which is in proportion to the signal transmitted from the D/A converter 121 so as to move the head carriage 103 at a predetermined speed or position the same at a predetermined position.

The optical card apparatus 101 has a photodetector (omitted from illustration) for converting light reflected by the optical card 130 into an electric signal. The above-described photodetector transmits an information reproduction signal to a demodulating circuit (omitted from illustration). The optical card apparatus 101 performs the tracking servo control and the focusing servo control by using the output signal transmitted from the above-described photodetector.

Figure 15A:
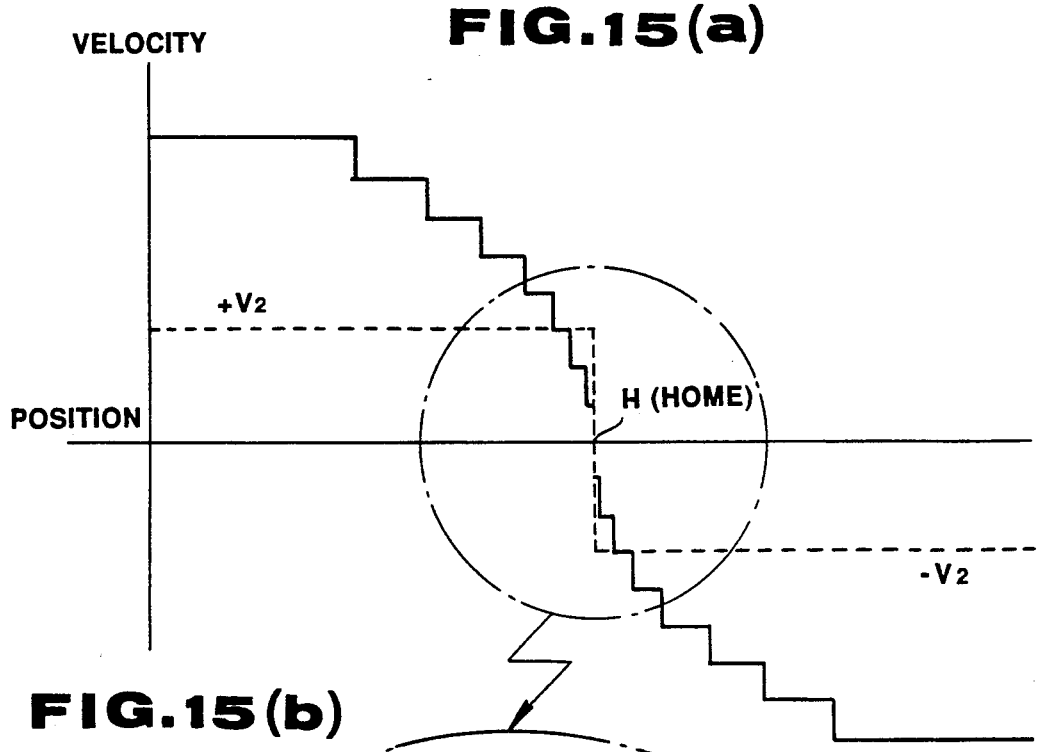
FIG. 15(a) and FIG. 15(b) both illustrate the home recovery operation performed in the information recording/reproducing apparatus; where
Figure 15B:
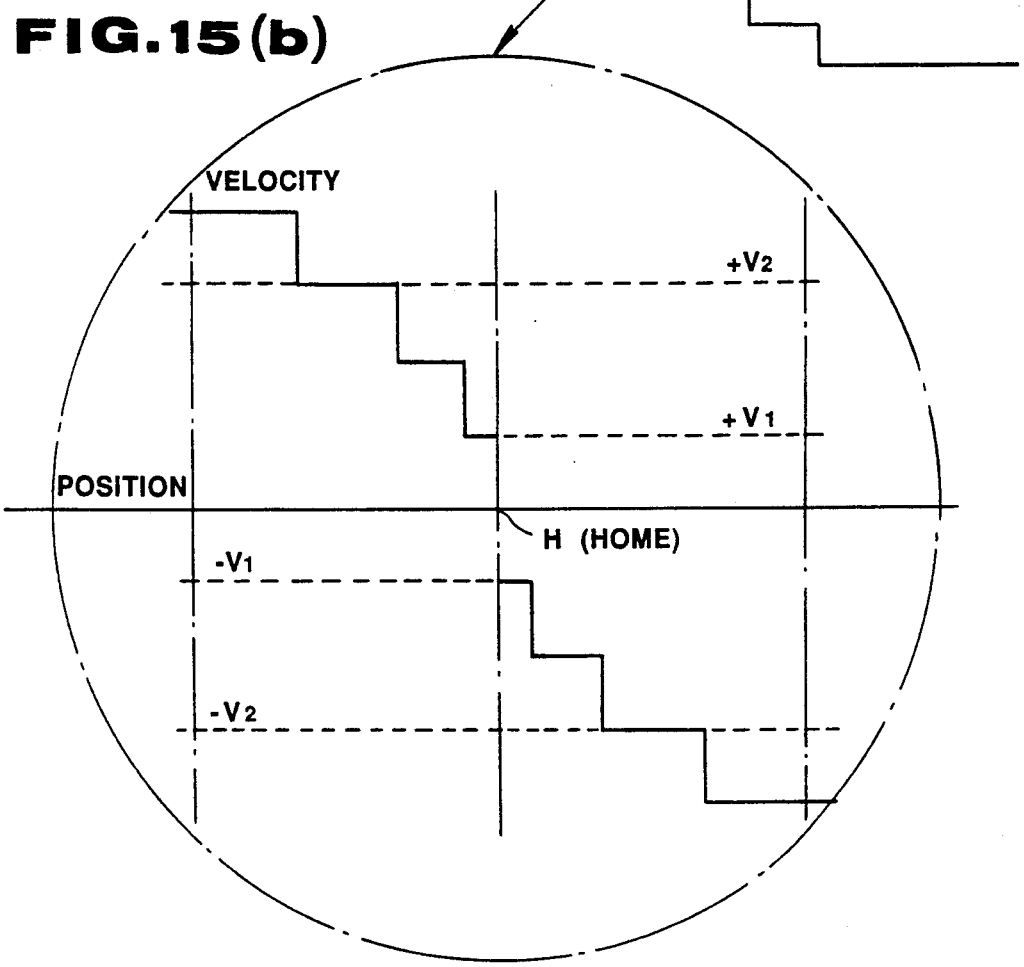

Referring to FIG. 15(a) and FIG. 15(b), the operation to be performed when the optical card apparatus 101 according to the present invention is moved to the home position will now be described.

(1) Power supply (2) Loading of the optical card 130 and movement of the light spot to the aiming track and read/write (R/W) operation (3) Discharge of the card after the R/W operation has been completed and the optical card is loaded.

The home position recovery operation is performed in each of the above-described operations (1) to (3). The home recovery operation will now be described sequentially. (1) First, the home recovery operation to be performed at the time of the home supply will now be described.

The scale detector 108 shown in FIG. 14 detects a fact that the head carriage 103 is positioned on the portion a or b of the home position. In a case where the scale detector 108 and the portion a (bright pattern) of the linear scale 106 are positioned to confront each other, the level of the pattern signal transmitted from the scale detector is made to be a high level. In a case where the same is positioned to confront the portion b (dark pattern) of the linear scale 106, the level of the pattern signal transmitted from the scale detector 108 is made to be a low level so that the side of the home position on which the head carriage 103 is positioned is detected.

The home speed processing circuit 111 transmits aiming speed "+V2" during a period in which the level of the pattern signal is high, while the same transmits aiming speed "−V2" during the period in which the level is low. At this time, the sequence control circuit 110 instructs the speed switching circuit 115 to select the output from the home speed processing circuit 111 so as to transmit the selected output to the speed calculating circuit 116. The speed calculating circuit 116 has received the present movement speed of the head carriage 103 from the speed detection circuit 112. Therefore, a signal denoting the difference between the two speed levels is transmitted to the VCM 104 via the D/A converter 121, the position control switching circuit 122 and the power amplifier 124.

Therefore, the head carriage 103 is, as designated by a dashed line of FIG. 15(a) in the range of the portion a of FIG. 14, moved at predetermined speed "+V2" in the direction toward the home position, while the same is moved at predetermined speed "−V2" in the range of the portion b of FIG. 13, in the direction toward the home position. The sequence control circuit 110 supervises the pattern signal transmitted from the scale detector 108 to recognize the position, at which the pattern signal has been changed from the high level to the low level, as the home position so that it transmits the resetting signal to the second counter 114. Furthermore, the sequence control circuit 110 issues an instruction to select the z-input side of the speed/position switching circuit 119. Therefore, the second counter 114 commences counting when it receives the resetting signal supplied from the sequence control circuit 110. The phase compensating and calculating circuit 120 supplies its output to the VCM 104 via the D/A converter 121, the position control switching circuit 122 and the power amplifier 124. That is, the second counter 114 is reset to zero at the home position. At this position (the home position), the head carriage 103 is located. (2) Then, the description will be made about the movement of the light spot to the aiming track and the home recovery operation at the time of the runaway of the head carriage during the R/W operation.

The optical card apparatus 101 is arranged in such a manner that the movement of the light spot in the tracking direction is made at the two end portions of the optical card 130 and the R/W operation is performed while moving the optical card 130 in the tracking direction.

In the seeking operation, the movement of the light spot from the home position to the aiming track is performed in such a manner that the head carriage 103 on which the actuator 102 is mounted is driven by the VCM 104. First, the sequence control circuit 110 sets data to the aiming setting circuit 118, the data corresponding to the position of a desired track. The first counter 113 is reset at the home position at the time of the power supply as described in (1). If the position of the head carriage 103 is not changed afterwards, the first counter 113 is set to zero (the home position). In this state, the speed table 117 transmits the speed which corresponds to the distance from the present position (the home position) to the aiming position as the aiming speed. The speed pattern to be transmitted from the speed table 117 is, as shown in FIG. 15(b), arranged to be high speed in a case where the distance to the aiming position is long and to be low speed in proportion to the distance.

Both of the speed switching circuit 115 and the speed/position switching circuit 119 are switched to the y-input terminals. As a result, the head carriage 103 commences the movement to the aiming track. The speed of the head carriage 103 is decelerated in accordance with the above-described speed pattern in proportion to the distance from the aiming position until it is set to predetermined speed "V1" just before the aiming position. At the position of the aiming track, the second counter 114 is reset and the speed/position switching circuit 119 is switched to the z-terminal so that the head carriage 103 is brought to the locating operation.

After it has been brought to a predetermined track, the light spot is brought into the tracking operation state in which it follows up the aiming track. As a result, the optical card 130 is driven in the tracking direction and the R/W operation is, if necessary, performed. The optical spot following up the displacement of the track in the tracking direction is performed in such a manner that the objective lens included in the actuator 102 is moved. During the R/W operation, the position control switching circuit 122 is switched over to the z-input side so that the position of the head carriage 103 is controlled such that the displacement of the lens during the tracking operation is minimized.

If there is dust or a flaw on the track which is irradiated with the light spot during the tracking operation or the R/W operation, the tracking operation becomes unstable increasing the risk of the runaway of the head carriage 103. The first counter 113 remains supervising the present position displacement signals transmitted from the scale detector 108 during the R/W operation or in the case of the runaway. Furthermore, the sequence control circuit 110 remains supervising the output from the first counter 113. Therefore, it is able to recognize the runaway state from the change in the position displacement signal so that it, as described later, returns the head carriage 103 to the home position and it again moves to the aiming track if the runaway takes place.

At this time, the light spot is moved on the optical card 130 to an end portion of the optical card 130 which is different from the end portion at the previous operation. The reason for this lies in that, if the R/W operation is retried again, the influence of dust or a flaw is changed and thereby the tracking operation is not necessarily made unstable. As a result, the R/W operation can sometimes be performed normally.

The home recovery operation to be performed at the time of runaway is performed as follows in a manner different from the operation to be performed at the time of the power supply. First, the sequence control circuit 110 issues an instruction to switch over all of the speed changing circuit 115, the speed/position switching circuit 119 and the position control switching circuit 122 to the y-input terminal. Therefore, the head carriage 103 is moved to the home position in accordance with the speed pattern shown in the speed table 117. Continuous lines of FIGS. 15(a) and 15(b) designate the aiming speed at the time of the home recovery operation to be performed when the runaway takes place.

FIGS. 15(b) is an enlarged view of a portion of FIG. 15(a). In a case where the same has been moved in the portion a of FIG. 14 and as well as the distance of the movement is long, the speed, at which the head carriage 103 is moved toward the home position, is made to be higher than "+V2". Then, the speed is changed to "+V1" via "+V2" in proportion to the distance from the home position. As a result, the carriage 103 is brought into the home position at the above-described speed. The sequence control circuit 110 switches over the speed/position switching circuit 119 to the phase compensating and calculating circuit 120 at the switch position of the pattern signal transmitted from the scale detector 108 so that locating to the home position is made.

In a case of the movement from the range of the portion b and as well as the distance of the movement is long, the head carriage 103 is brought to the home position at a speed higher than "−V2". Furthermore, the speed is made to be "−V1" via "−V2" in proportion to the distance from the home position before it is located to the home position. In a case where the distance of the movement to the home position is short, the head carriage 103 commences its movement at a speed of, for example, "±V2" in proportion to the distance. Then, the carriage 103 is brought to the home position at a speed of, for example, "±V1" so as to be located.

According to this embodiment, in the case where the distance of the movement to the home position is great as shown in FIG. 15(b), the movement speed of the head carriage 103 exceeds "iV2" and the same is decelerated in proportion to the distance to the home position. Therefore, the movement time can be reduced in comparison to that required at the time of the power supply shown in (1) and the home recovery operation. Since the speed at which the head carriage 103 is brought to the home position is arranged to be less than that arranged at the time of the power supply, the time (setting time) taken to the moment at which the position of the head carriage 103 is stabled in the locating operation to the home position can be shortened.

(3) Then, the operation to be performed at the time of the discharge of the card after the R/W operation has been completed and the operation to be performed at the time of insertion of the discharged card will now be described.

The optical card apparatus according to the present invention is arranged in such a manner that the home recovery operation is performed at the time of the discharge of the card and the next insertion of the card. Since the positional relationship between the head carriage 103 and the home position has been previously known in the above-described case, the home recovery operation is performed similarly to the operation to be performed when runaway takes place as shown in (2). However, after the movement to the home position has been made, the sequence control circuit 110 resets the first counter 113 in a state where the locating operation has been stabled. The reason for this lies in that the influence of an erroneous count made by the first counter 113 due to generation of noise or the like on the next process must be prevented.

According to this embodiment, in a case where the positional relationship between the head carriage and the home position has been previously known at the time of the commencement of the home recovery operation, the movement of the head carriage 103 is controlled in accordance with the speed pattern for use in the seeking operation so as to be moved to a position adjacent to the home position. Furthermore, the pattern signal transmitted from the scale detector 108 is supervised to confirm the home position. As a result, locating can be performed. Therefore, the time which taken to complete the setting can be shortened due to the high speed movement to the home position and the realized low speed movement to the home position. As a result, the home recovery time can be reduced and thereby the processing speed in the apparatus can be reduced.

Then, an apparatus for performing the locating operation will now be described with reference to FIG. 16.

Reference numeral 201 represents an optical card serving as the recording medium which has a multiplicity of straight and parallel information tracks formed in a predetermined region. An optical card driving apparatus 202 is capable of driving the optical card 201 in the direction of the track, the optical card driving apparatus 202 being controlled by an optical card control device 203. An optical head 204 emits beam spots to the surface of the track formed on the optical card 201 to record-/reproduce data. A read signal processing apparatus 205 demodulates and reproduces information written in the portion on the track in response to a signal read by the optical head 204. The optical head 204 is mounted on a carriage 206 so as to be driven in a direction perpendicular to the track formed on the optical card 201. Reference numeral 207 represents a carriage driving device for driving the carriage 206. Reference numeral 208 represents a carriage control device for controlling the carriage driving device 207.

A home scale 209 acts to detect the home position formed on the optical card 201, the home scale 209 being secured to the carriage 206. A home scale detector 210 transmits a signal which is made to be "0" or "1" in accordance with the status of the home scale 209. A signal transmitted from the home scale detector 210, that is, an HS signal, is supplied to the carriage control device 208 and a scale signal supervising device 213 to be described later.

The apparatus according to the present invention is arranged in such a manner that the linear scale 211 is secured to the carriage 206. Furthermore, the linear scale 211 has black portions (portions which do not reflect light) and non-black portions (portions which reflect light) which are alternately formed at intervals which correspond to the track pitch width of the optical card 201. The above-described interval is made to be about 12 microns according to this embodiment. Similarly to the operation performed by the home scale detector 210, the linear scale detector 212 transmits a signal (hereinafter called an "LS signal") which is made to be "0" or "1" in accordance with the status of the linear scale 211. The number of pulses of the LS signal corresponds to the number of the tracks.

The scale signal supervising device 213 supervises the LS and HS signals and comprises a linear scale counter 214 for counting the number of the pulses of the LS signal and a linear scale counter value storage device 215 for storing the value of the linear scale counter 214. The scale signal supervising device 213 is connected to the carriage control device 108.

A system controller 216 controls the overall operation of the optical card apparatus and the same is connected to the optical card control device 203, the read signal processing device 205, the carriage control device 208 and the scale signal supervising device 213.

Figure 17:
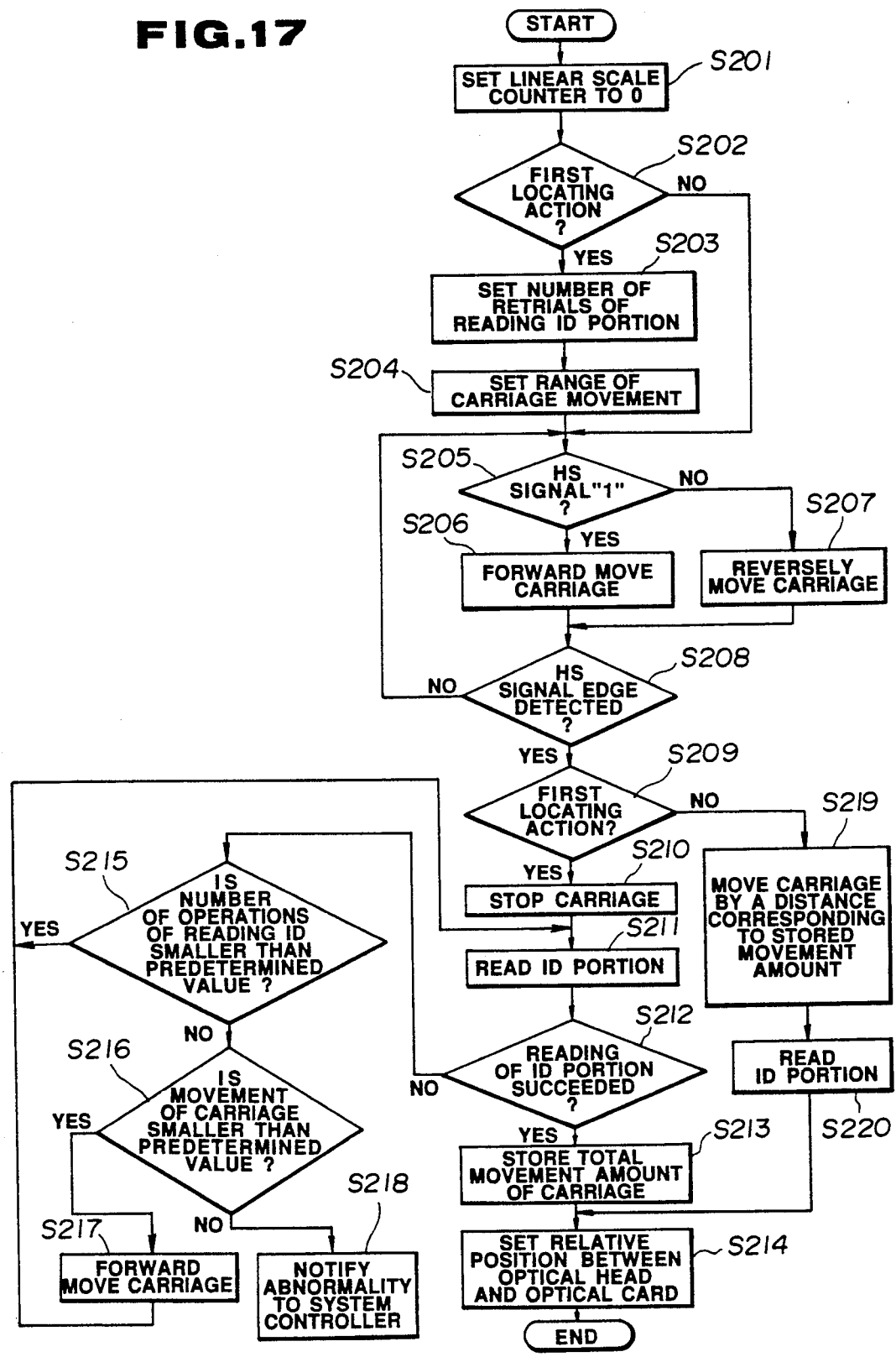
FIG. 17 is a flow chart which illustrates the operation of locating the optical head.

Then, the operation of the apparatus according to this embodiment will now be described with reference to a flow chart shown in FIG. 17.

When the system control system 216 for controlling the overall operation of the optical card apparatus detects the insertion of the optical card 201 into the optical card apparatus by a method (omitted from illustration), the linear scale counter 214 connected to the scale signal supervising device 213 is initialized to a value of zero by the system controller 216 (step S201). In this state, a discrimination is made whether or not the subject operation is the first locating operation (step S202). In the case where the subject operation is the first locating operation, the number of retrials is set to a memory to which the number of retrials of reading the ID portions at the time of the locating operation is set, for example, a counter (step S203). In ensuing step S204, the range of movement of the carriage 206 is set to the scale signal supervising device 213. The carriage movement range according to this embodiment is arranged to a range on the surface of the optical card 201 to which data can be recorded.

Then, the present status of the home scale 209 is examined by the carriage control device 208 in accordance with the HS signal transmitted from the home scale detector 210. If the HS signal is "1" (step S205), the carriage drive device 207 drives the carriage 206 in a direction in which the HS signal becomes "0", that is, in the forward direction until the edge of the HS signal is detected (step S206). Similarly, if the HS signal is "0" (step S205), the same is driven in a direction in which the HS signal becomes "1", that is, in the reverse direction until the edge of the HS signal is detected (step S207).

When the edge of the HS signal has been detected by the carriage control device 207, that is, when the home position formed on the optical card 201 has been detected (step S208), a discrimination is made whether or not the subject operation is the first locating operation (step S209). If the subject operation is the first locating operation, the carriage control device controls the carriage driving device 207 to stop the carriage 206 (step S210). Then, the optical card 201 is driven in the direction of the track by the optical card driving device 202 to read the ID portion (step S211). The signal read by the optical head 204 is demodulated and reproduced by the read signal processing device 205 which reproduces information. Information reproduced is supplied to the system controller 216 so as to be subjected to a discrimination whether or not the same has been correctly reproduced by a discrimination circuit included in the system controller 216 (step S212). Then, the operation to be performed if the same has been reproduced correctly, that is, information about the track could be obtained from the read ID portion will now be described. In this case, the home position of the optical head 204 is set only by the home scale 209. After the home position has been detected, the carriage 206 is not moved. That is, since the overall amount of movement of the carriage 206 is zero, the linear scale counter 214 displays the initial value, that is, "0" which is then stored in the linear scale counter value storage device 215 (step S213). Then, the positional relationship between the optical card 201 and the optical head 204 is set by using the above-described track information (step S214). Thus, locating of the optical head is completed.

If the same has not been reproduced correctly, the ID portion is again read in a range set to the above-described retry number counter for counting the retrials of the ID portion at the time of locating the optical head (steps S212 and S215). If the ID portion cannot be reproduced in the above-described reading operation, a discrimination is made whether or not the subject region is included in a predetermined carriage movable range (step S216). If the subject region is included in the above-described range, the carriage 106 is moved in the forward direction (S217).

Then, the method of moving the carriage 206 will now be described. First, the linear scale counter 214 mounted on the scale signal supervising device 213 is made active and the carriage 206 is driven by the carriage driving device 207. At this time, the linear scale counter 214 counts the number of pulses of the LS signal generated by the linear scale detector 212 in accordance with the movement of the carriage 206. The number of the pulse of the LS signal counted corresponds to the number of tracks traversed by the optical head 204 from the track at which it is positioned before the movement to the track to which the same is moved. Therefore, by supervising the value of the linear scale counter 214, the amount of movement of the carriage 206 can be determined. Therefore, the scale signal supervising device 213 supervises the linear scale counter 214 to move the carriage 206 by a predetermined quantity. According to this embodiment, the above-described predetermined quantity is previously set to a value within a range in which it does not come across dust or contamination present on the track. After the above-described movement by a predetermined quantity has been made, the carriage 206 is stopped to drive the optical card 201 so as to read the ID portion on the track to which the optical head 204 has been moved (step S211). The above-described operation is repeated until the ID portion can be correctly read in the previously set carriage movement range (steps S212 and 215 to 217). When the ID portion has been correctly reproduced (step S212), the value of the linear scale counter 214 at this time, that is, the total quantity of the movement of the carriage 206 from the home position set by the home scale 209, is stored in the linear scale counter value storage device 215 (step S213). Furthermore, the positional relationship between the optical card and the optical head is set by using read track information (step S214). Thus, locating of the optical head 204 is completed. If the ID portion could not be reproduced in the set carriage movable range (step S216), a discrimination is made that an error of reading the ID portion has occurred and the occurrence of the abnormality is notified to the system controller 216 (step S218). The system controller 216, which receives the notification of the abnormality, performs a process of discharging the card or the like.

Then, the second and ensuing operations of locating the optical head 204 will now be described. When the system controller 216 for controlling the overall operation of the optical card apparatus detects a fact that it is impossible to recognize the positional relationship between the optical card 210 and the optical head 204 due to runaway of the optical head 204 caused by an off-track or the like during the data recording or the reproducing operation, the linear scale counter 214 is again initialized by the system controller 216 (step S201). Since the number of the retrials of reading the ID portion and the carriage movable range have been previously set, the above-described operations are not performed. Furthermore, the status of the home scale 209 is, similarly to the first locating operation, examined by the carriage control device 208 in response to the HS signal transmitted from the home scale detector 210. In addition, the carriage 206 is driven in a direction in which the edge of the HS signal is obtained until the same is detected (steps S205 to S208). When the edge of the HS signal is detected, the linear scale counter 214 is simultaneously brought into the active state. Then, a discrimination is made that the subject operation is the second or the ensuing operation of locating the optical head 204 (step S209). If the subject operation is the second or the ensuing locating operation, the carriage 206 is moved such that the value of the linear scale counter 214 approximates the total amount of the optical head 204 from the home position at the first operation of locating the optical head, that is, the value stored in the linear scale counter value storage device 215 (step S219). Although the value of the linear scale counter 214 is changed during the movement, the above-described values is subjected to a comparison with the above-described total quantity of the movement by a comparator included in the scale signal supervising device 213. Then, the carriage 206 is stopped at a position at which the above-described values coincide with each other. The track placed at the above-described position to which the carriage 206 has been moved is the track from which the ID Portion has been correctly reproduced at the time of the first operation of locating the optical head. Then, the optical card 201 is moved to read the ID portion of this track (step S220) to set the positional relationship between the optical card 201 and the optical head 204 by using information about the above-described track (step S214). Thus, the second or the ensuing operation of locating the optical head is completed.

As described above, in a case where the optical head cannot be moved to its home position set by the home scale 209, the optical head is moved by a predetermined quantity to change the home position for the optical head in order to perform locating of the optical head. Therefore, even if dust, contamination or a flaw is present on a specific track of the optical card, the optical head can be stably located. Furthermore, the position which has been subjected to the first locating operation is stored. Therefore, it is necessary for the operation of locating the optical head to be simply performed in such a manner that the optical head is located at the position which is moved by a previously stored quantity from the position determined by the home scale 209. Therefore, the operation of locating the optical head can be completed in a short time and thereby a reliable optical card apparatus can be provided.

Although the above-described embodiment is arranged in such a manner that the carriage is moved in the forward direction at the time of the change of the home position, a similar effect can, of course, be obtained from an arrangement in which the same is moved in the reverse direction. As an alternative to this, the forward directional movement and the reverse directional movement may be combined with each other. As an alternative to the above-described structure, a structure may, of course, be employed in which the operation of locating the optical head after changing the home position for the optical head is performed by further changing the home position within the carriage movable range if locating of the optical head becomes impossible at the changed home position for the optical head during the operation of the optical card apparatus.

Figure 16:
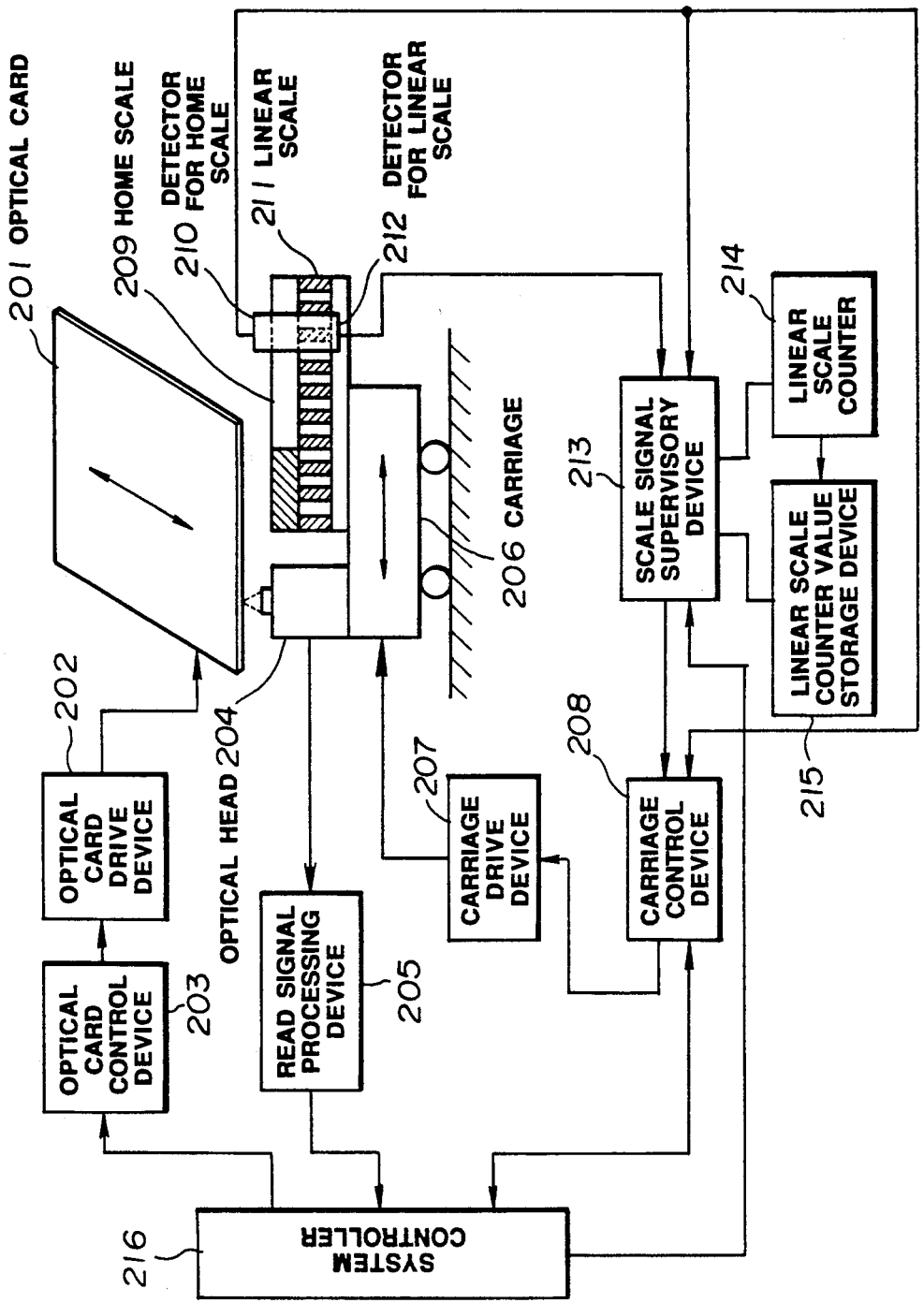
FIG. 16 is a block diagram which illustrates the operation of locating the optical head of the information recording/reproducing apparatus.

According to the apparatus shown in FIG. 16, a problem can occur in that the overall optical recording medium cannot be used due to a failure of a specific track on the optical recording medium can be prevented. Therefore, the positional relationship between the optical head and the optical recording medium can stably and at high speed set. Therefore, a reliable information recording/reproducing apparatus can be provided.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An optical card recording/reproducing apparatus comprising:
   an optical head for recording and/or reproducing information by applying light beams to a rectangular optical card having linear tracks to which information is optically recorded;
   card holding means for detachably holding said optical card;
   speed detection means for detecting relative speed between said card holding means and said optical head in a track direction which is in parallel to said tracks formed on said optical card;
   card holder position detection means for detecting the relative position between said card holding means and said optical head in at least said track direction;
   speed setting means for setting relative movement speed between said card holding means and said optical head in accordance with an output from said card holder position detection means;
   first moving means for relatively moving at least said light beam in said track direction in accordance with an output from said speed detection means and that from said speed setting means;
   second moving means for relatively moving at least said light beam in a track transversal direction which traverses said tracks of said optical card;
   reference position detection means for detecting a reference position signal formed on said optical card;
   correction means for correcting an output of said card holder position detection means in accordance with the output from said reference position detection means; and
   control means for discriminating whether or not a correction operation performed by said correction means has failed and changing said light beam in said track transversal direction in a case where a discrimination is made that said correction operation has failed so as to again perform said correction operation.

2. An optical card recording/reproducing apparatus according to claim 1, wherein said first moving means is conveying means for moving said card holding means or said optical head in said track direction.

3. An optical card recording/reproducing apparatus according to claim 2, wherein said conveying means has a motor and said speed detection means has an encoder for detecting the rotational speed of said motor.

4. An optical card recording/reproducing apparatus according to claim 1, wherein said second moving means is conveying means for moving said optical head or said card holding means in said track transversal direction.

5. An optical card recording/reproducing apparatus according to claim 1, wherein said second moving means is optical system moving means for, in said track transversal direction, moving an optical system accommodated in said optical head and converging and applying said light beams to said optical card.

6. An optical card recording/reproducing apparatus according to claim 1, wherein said card holder position detection means consists of a movement quantity detection means for detection the movement quantity made by said first moving means.

7. An optical card recording/reproducing apparatus according to claim 1, wherein said speed setting means is speed data recording means to which speed data about the movement made by said first moving means is recorded.

8. An optical card recording/reproducing apparatus according to claim 1, wherein said reference position detection means has ID mark detection means for discriminating whether or not a signal read from said optical card by said optical head represents a pre-recorded ID mark found on said card.

9. An optical card recording/reproducing apparatus according to claim 8, wherein said control means has discriminating means for discriminating whether or not said ID mark detection means has detected said pre-recorded ID mark in a predetermined time and discriminates in accordance with an output from said discriminating means whether or not said correction operation has failed.

10. An optical card recording/reproducing apparatus according to claim 1, wherein said correction means has data memory means containing locating data which corresponds to said reference position signal on said optical card.

11. An optical card recording/reproducing apparatus according to claim 10, wherein said correction means corrects position data of said card holder position detection means by reading said locating data contained in said data memory means in accordance with an output obtained from said reference position detection means when said reference position detection means detects said position signal.

12. An optical card recording/reproducing apparatus according to claim 1, wherein said control means transmits a control signal for driving said second moving means in a case where said control means discriminates that said correction operation has failed.

13. An optical card recording/reproducing apparatus comprising:
an optical head for recording/reproducing information by applying light beams to a rectangular optical card having linear tracks to which information is optically recorded;
card holding means for detachably holding said optical card;
card holder position detection means for detecting the relative position between said card holding means and said optical head in at least said track direction;
first moving means for relatively moving at least said light beam in said track direction;
second moving means for relatively moving at least said light beam in a track transversal direction which traverses said tracks of said optical card;
reference position signal detection means for detecting a reference position signal formed on said optical card;
correction means for correcting an output of said card holder position detection means in accordance with the output from said reference position signal detection means; and
control means for discriminating whether or not a correction operation performed by said correction means has failed and changing an optical spot in said track transversal direction in a case where a discrimination is made that said correction operation has failed so as to again perform said correction operation.

14. An optical card recording/reproducing apparatus according to claim 13, wherein said first moving means is conveying means for moving said card holding means or said optical head in said track direction.

15. An optical card recording/reproducing apparatus according to claim 13, wherein said second moving means is conveying means for moving said optical head or said card holding means in said track transversal direction.

16. An optical card recording/reproducing apparatus according to claim 13, wherein said reference position signal detection means has ID mark detection means for discriminating whether or not a signal read from said optical card by said optical head represents a pre-recorded ID mark found on said card.

17. An optical card recording/reproducing apparatus according to claim 16, wherein said control means has discriminating means for discriminating whether or not said ID mark detection means has detected said pre-recorded ID mark in a predetermined time and discriminates in accordance with an output from said discriminating means whether or not said correction operation has failed.

18. An optical card recording/reproducing apparatus according to claim 13, wherein said correction means has a locating data memory means containing locating data which corresponds to said reference position signal denoting a reference position formed on said optical card.

19. An optical card recording/reproducing apparatus according to claim 18, wherein said correction means corrects position data of said card holder position detection means by reading said locating data contained in said locating data memory means in accordance with an output obtained from said reference position signal detection means when said reference position detection means detects said reference position signal.

20. An optical card recording/reproducing apparatus according to claim 13, wherein said control means transmits a control signal for driving said second moving means in a case where said control means discriminates that said correction operation has failed.

21. An optical card recording/reproducing apparatus comprising:
an optical head for recording and/or reproducing information by applying light beams to a rectangular optical card having linear tracks to which information is optically recorded;
card holding means for detachably holding said optical card;

speed detection means for detecting relative speed between said card holding means and said optical head in a track direction which is in parallel to said tracks formed on said optical card;

card holder position detection means for detecting the relative position between said card holding means and said optical head in at least said track direction;

speed setting means for setting relative movement speed between said card holding means and said optical head in accordance with an output from said position detection means;

first moving means for relatively moving at least said light beam in said track direction in accordance with an output from said speed detection means and that from said speed setting means;

second moving means for relatively moving at least said light beam in a track transversal direction which traverses said tracks of said optical card;

reference position signal detection means for detecting a reference position signal formed on said optical card;

correction means for correcting an output of said card holder position detection means in accordance with the output from said reference position signal detection means; and control means arranged in such a manner that, when a correction operation performed by said correction means has failed, it changes the relative position between said optical head and said optical card by said second moving means to again perform said correction operation.

* * * * *